(12) United States Patent
Fröberg Olsson et al.

(10) Patent No.: US 12,137,421 B2
(45) Date of Patent: Nov. 5, 2024

(54) UE AND FIRST NETWORK NODE FOR HANDLING POWER ADJUSTMENTS

(71) Applicant: Telefonaktiebolaget LM Ericsson (publ), Stockholm (SE)

(72) Inventors: Jonas Fröberg Olsson, Ljungsbro (SE); Kittipong Kittichokechai, Järfälla (SE); David Sandberg, Sundbyberg (SE); Alexey Shapin, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 623 days.

(21) Appl. No.: 17/598,442

(22) PCT Filed: Mar. 27, 2020

(86) PCT No.: PCT/EP2020/058751
§ 371 (c)(1),
(2) Date: Sep. 27, 2021

(87) PCT Pub. No.: WO2020/201106
PCT Pub. Date: Oct. 8, 2020

(65) Prior Publication Data
US 2022/0191801 A1  Jun. 16, 2022

Related U.S. Application Data

(60) Provisional application No. 62/825,913, filed on Mar. 29, 2019.

(51) Int. Cl.
*H04W 52/14* (2009.01)
*H04W 52/24* (2009.01)
(Continued)

(52) U.S. Cl.
CPC ....... *H04W 52/146* (2013.01); *H04W 52/243* (2013.01); *H04W 52/281* (2013.01); *H04W 72/1263* (2013.01)

(58) Field of Classification Search
CPC ............ H04W 52/146; H04W 52/243; H04W 52/281; H04W 72/1263; H04W 52/24
See application file for complete search history.

(56) References Cited

U.S. PATENT DOCUMENTS

2009/0239590 A1   9/2009   Parkvall
2018/0103428 A1*  4/2018   Jiang ................. H04W 52/0225

FOREIGN PATENT DOCUMENTS

EP   3301984 A1   4/2018

OTHER PUBLICATIONS

International Search Report and Written Opinion dated Nov. 16, 2020 for International Application No. PCT/EP2020/058751 filed Mar. 27, 2020, consisting of 22-pages.

(Continued)

*Primary Examiner* — Fred A Casca
(74) *Attorney, Agent, or Firm* — Weisberg I.P. Law, P.A.

(57) ABSTRACT

A method performed by a first network node is provided. The method includes determining a power backoff indicator (PBI) for a first user equipment (UE) based on at least one of channel conditions of the first UE and channel conditions of a second UE, data reliability requirements of the second UE, and data performance of the first UE. The method includes transmitting the PBI toward the first UE. The method includes receiving second data from the first UE, wherein transmission of the second data has been adjusted based on the PBI. The UE receives the PBI. Responsive to determining to apply the PBI, the UE backs off the power by adjusting the power according to at least one of a configuration and the PBI. The UE transmits second data to the first network node with the backed off or adjusted power.

20 Claims, 13 Drawing Sheets

(51) Int. Cl.
H04W 52/28 (2009.01)
H04W 72/1263 (2023.01)

(56) References Cited

OTHER PUBLICATIONS

3GPP TSG RAN WG1 Meeting #92 R1-1802289; Title: Discussion on handling of UL multiplexing of transmissions with different reliability requirement; Agenda Item: 7.2.4; Source: Apple Inc.; Document for: Discussion/Decision; Date and Location: Feb. 26-Mar. 2, 2018, Athens, Greece, consisting of 5-pages.

3GPP TSG RAN WG1 Meeting #92 R1-1801356; Title: UL multiplexing between URLLC and eMBB; Agenda Item: 7.2.4; Source: Huawei, HiSilicon; Document for: Discussion and decision; Date and Location: Feb. 26-Mar. 2, 2018, Athens, Greece, consisting of 8-pages.

ETSI TS 138 213 V15.5.0; 5G; NR; Physical layer procedures for control (3GPP TS 38.213 version 15.5.0 Release 15); May 2019, consisting of 106-pages.

\* cited by examiner

UE AND FIRST NETWORK NODE FOR HANDLING POWER ADJUSTMENTS

CROSS-REFERENCE TO RELATED APPLICATIONS

This application is a Submission Under 35 U.S.C. § 371 for U.S. National Stage Patent Application of International Application No.: PCT/EP2020/058751, filed Mar. 27, 2020 entitled "UE AND FIRST NETWORK NODE FOR HANDLING POWER ADJUSTMENTS," which claims priority to U.S. Provisional Application No. 62/825,913, filed Mar. 29, 2019, the entireties of both of which are incorporated herein by reference.

TECHNICAL FIELD

Embodiments herein relate generally to a user equipment (UE), a method performed by the UE, a first network node and a method performed by the first network node.

BACKGROUND

Ultra-reliable and low latency communication (URLLC) is one of the main use cases of 5G new radio (NR). URLLC has strict requirements on transmission reliability and latency, i.e., 99.9999% reliability within 1 ms one-way latency. In NR Rel-15, several new features and enhancements were introduced to support these requirements. In Rel-16, standardization works are focused on further enhancing URLLC system performance as well as ensuring reliable and efficient coexistent of URLLC and other NR use cases. One example scenario is when both enhanced mobile broadband (eMBB) and URLLC UEs co-exist in the same cell. Here, mainly two approaches have been identified to support multiplexing/prioritization.

The first method is based on power control to increase the power of the URLLC to make it more resilient to interference from the eMBB user(s). Power control for release 15 UEs are specified in 3GPP TS 38.213, 7.1.1. The main advantage with this option is that it does not require any changes in the behavior of the eMBB UE, hence it works with Release 15 UEs. One disadvantage is that to guarantee the performance of the URLLC UE while being interfered by eMBB traffic, the URLLC UE's transmit power spectral density (PSD) may have to be increased significantly. But for example, UEs not in the close vicinity of the base station may not have the power budget to do this increase and will therefore experience much lower Signal to Interference and Noise Ratio (SINR) than the required.

The second method is based on a preemption indicator being transmitted from the base station to the interfering eMBB UEs. When a URLLC UE is scheduled on time/frequency resources that are already scheduled to a lower priority eMBB UE, the base station can transmit a preemption indicator to the eMBB UE. Upon reception of this indicator the eMBB UE will avoid transmitting on a set of preconfigured resources. The details of the preemption indicator and the UE behavior upon reception of this signal is currently discussed in 3GPP.

A typical use case for this multiplexing/prioritization is when eMBB traffic is scheduled in a whole slot and all PRBs (physical resource blocks) and time sensitive URLLC needs to be transmitted. Here, time sensitive means that instant access to the channel is required, and waiting until the next slot before transmission will introduce too much delay. In NR URLLC traffic maybe be scheduled on one or a few OFDM symbols and with a significantly shorter time from the uplink grant to when the uplink transmission takes place. This means that eMBB users may already have been scheduled on all available time/frequency resources. With the preemption indicator the gNB can choose to preempt the eMBB traffic and hence reduce the interference to the URLLC UE.

It has been made clear that power control-based schemes will typically only be effective for URLLC UEs that are relatively close to the base station. For URLLC UEs with a higher pathloss, the uplink power will be saturated and hence there is no budget for power increase.

On the other hand, eMBB users that are frequently preempted using the preemption indicator may lose too much performance, either due to frequent retransmissions or due to inefficient spectrum utilization of the non-preempted resources.

It may be necessary to adjust a transmit power when the UE transmits data to a base station. If the transmit power is too low, the base station may not be able to correctly receive the data. If the transmit power is too high, it may cause interference to another UE. Therefore, the base station needs to adjust the transmit power of the UE in a wireless communication system.

Therefore, there is a need to at least mitigate or solve this issue.

SUMMARY

An objective of embodiments herein is therefore to enable power adjustments. In other words, to enable a power backoff indicator, to enable a group common power backoff indicator, etc.

Embodiments herein afford many advantages, of which a non-exhaustive list of examples follows:

An advantage of the embodiments herein is that they allow increased flexible control of which uplink transmission power is used in different parts of the time/frequency resource. This enables the first network node to tradeoff between URLLC reliability and eMBB performance. The first network node can not only select between preemption (with potentially large degradation of eMBB performance) and power control (with potentially large degradation in URLLC reliability) but can configure a set of options to use to fulfill URLLC reliability requirements while at the same time minimizing the performance impact to eMBB traffic.

According to some embodiments of inventive concepts, a method performed by a first network node is provided. The method includes determining a power backoff indicator (PBI) for a first user equipment (UE) based on at least one of channel conditions of the first UE and channel conditions of a second UE, data reliability requirements of the second UE, and data performance of the first UE. The method includes transmitting the PBI toward the first UE. The method includes receiving second data from the first UE, wherein transmission of the second data has been adjusted based on the PBI.

According to various embodiments, a network node is provided that includes processing circuitry and memory coupled with the processing circuitry, wherein the memory includes instructions that when executed by the processing circuitry causes the network node to perform operations. The operations include determining a power backoff indicator (PBI) for a first user equipment (UE) based on at least one of channel conditions of the first UE and channel conditions of a second UE, data reliability requirements of the second UE, and data performance of the first UE. The operations include transmitting the PBI to the first UE. The operations include receiving second data from the first UE (101), wherein transmission of the second data has been adjusted based on the PBI.

According to other embodiments of inventive concepts, a method performed by a user equipment (UE) is provided. The method includes receiving a Power Backoff Indicator (PBI) comprised in a PBI message from a first network node. The method includes responsive to determining to apply the PBI, backing off the power by adjusting the power according to at least one of a configuration and the PBI. The method includes transmitting second data to the first network node with the backed off or adjusted power.

According to various embodiments, a user equipment (UE) is provided that includes processing circuitry and memory coupled with the processing circuitry, wherein the memory includes instructions that when executed by the processing circuitry causes the UE to perform operations. The operations include receiving a Power Backoff Indicator (PBI) comprised in a PBI message from a first network node. The operations further include responsive to determining to apply the PBI, backing off the power by adjusting the power according to at least one of a configuration and the PBI. The operations further include transmitting second data to the first network node with the backed off or adjusted power.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail by way of example only in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Instead of always preempting interfering UEs, a limit on the transmit power spectral density they can use on different parts of the time/frequency resource can be set.

The first network node can estimate how much interference reduction is needed for successful reception of URLLC data. Different regions of the time/frequency resource can be pre-configured with different power control settings and the first network node can therefore select a suitable resource to schedule URLLC data in.

Figure 1:
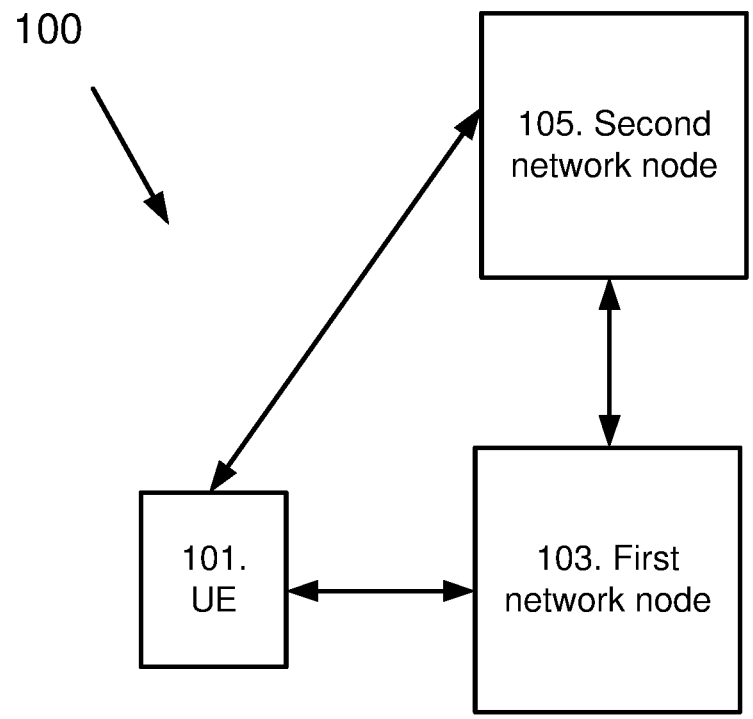
FIG. 1 is a schematic drawing illustrating a communications system.

FIG. 1 depicts non-limiting examples of a communications system 100, which may be a wireless communications network, sometimes also referred to as a wireless communications system, cellular radio system, or cellular network, in which embodiments herein may be implemented. The communications system 100 may typically be a 5G system, 5G network, NR-U (New-Radio unlicensed spectrum) or Next Gen System or network, LAA (License-Assisted Access), MulteFire, a 4G system, a 3G system, a 2G system, a LTE-M system a further generation system or any other suitable system. The communications system 100 may alternatively be a younger system than a 5G system. The communications system 100 may support other technologies such as, for example, Long-Term Evolution (LTE), LTE-M LTE-Advanced/LTE-Advanced Pro, e.g. LTE Frequency Division Duplex (FDD), LTE Time Division Duplex (TDD), LTE Half-Duplex Frequency Division Duplex (HD-FDD), LTE operating in an unlicensed band, NB-IoT. Thus, although terminology from 5G/NR and LTE may be used in this disclosure to exemplify embodiments herein, this should not be seen as limiting the scope of the embodiments herein to only the aforementioned systems. The embodiments herein apply to any previous, current or future system.

The communications system 100 comprises a plurality of network nodes, whereof a first network node 103 and a second network node 105, also referred to herein as a network node 103, 105, are depicted in the non-limiting example of FIG. 1. Any of the first network node 103 and the second network node 105 may be a radio network node, such as a base station, or any other network node with similar features capable of serving a user equipment, such as a wireless device or a machine type communication device, in the communications system 100. The base station may be a gNB, eNB, Nb, MeNB (master Node B), etc. In some examples, any of the first network node 103, and the second network node 105 may be co-localized, or be part of the same network node.

The communications system 100 covers a geographical area which may be divided into cell areas, wherein each cell area may be served by a network node, although, one network node may serve one or several cells. In the example in FIG. 1, the communications system 100 may comprises a first cell and a second cell. In FIG. 1, the first network node 103 may serve the first cell and the second network node 105 may serve the second cell. Any of the first network node 103 and the second network node 105 may be of different classes, such as, e.g., macro base station (BS), home BS or pico BS, based on transmission power and thereby also cell size. Any of the first network node 103 and the second network node 105 may be directly connected to one or more core networks. In some examples, any of the first network node 103 and the second network node 105 may be a distributed node, such as a virtual node in the cloud, and it may perform its functions entirely on the cloud, or partially, in collaboration with a radio network node.

A plurality UEs may be located in the communication system 100, whereof a UE 101, which may also be referred to simply as a device, is depicted in the non-limiting example of FIG. 1. The UE 101, e.g. a LTE UE or a 5G/NR UE, an IoT UE, a MTC UE, a BL-CE UE, a normal UE, a CE UE, a BL UE, it may be a wireless communication device which may also be known as e.g., a wireless device, a mobile terminal, wireless terminal and/or mobile station, a mobile telephone, cellular telephone, or laptop with wireless capability, just to mention some further examples. The UE 101 may be a device by which a subscriber may access services offered by an operator's network and services outside operator's network to which the operator's radio access network and core network provide access, e.g. access to the Internet. The UE 101 may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device, Internet of Things (IOT) device, terminal device, communication device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another UE, a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system 100.

The first network node 103 may be configured to communicate in the communications system 100 with the UE 101 over a first communication link, e.g., a radio link. The second network node 105 may be configured to communicate in the communications system 100 with the first network node 103 over a second communication link, e.g., a radio link. The second network node 105 may be configured to communicate in the communications system 100 with the UE 101 over a third communication link, e.g., a radio link or a wired link, although communication over more links may be possible.

The UE 101 is enabled to communicate wirelessly within the communications system 100. The communication may be performed e.g. between two devices, between a device and a regular telephone, between the UE 101 and a network node, between network nodes, and/or between the devices and a server via the radio access network and possibly one or more core networks and possibly the internet.

It should be noted that the communication links in the communications network may be of any suitable kind including either a wired or wireless link. The link may use any suitable protocol depending on type and level of layer (e.g. as indicated by the OSI model) as understood by the person skilled in the art.

Figure 2:
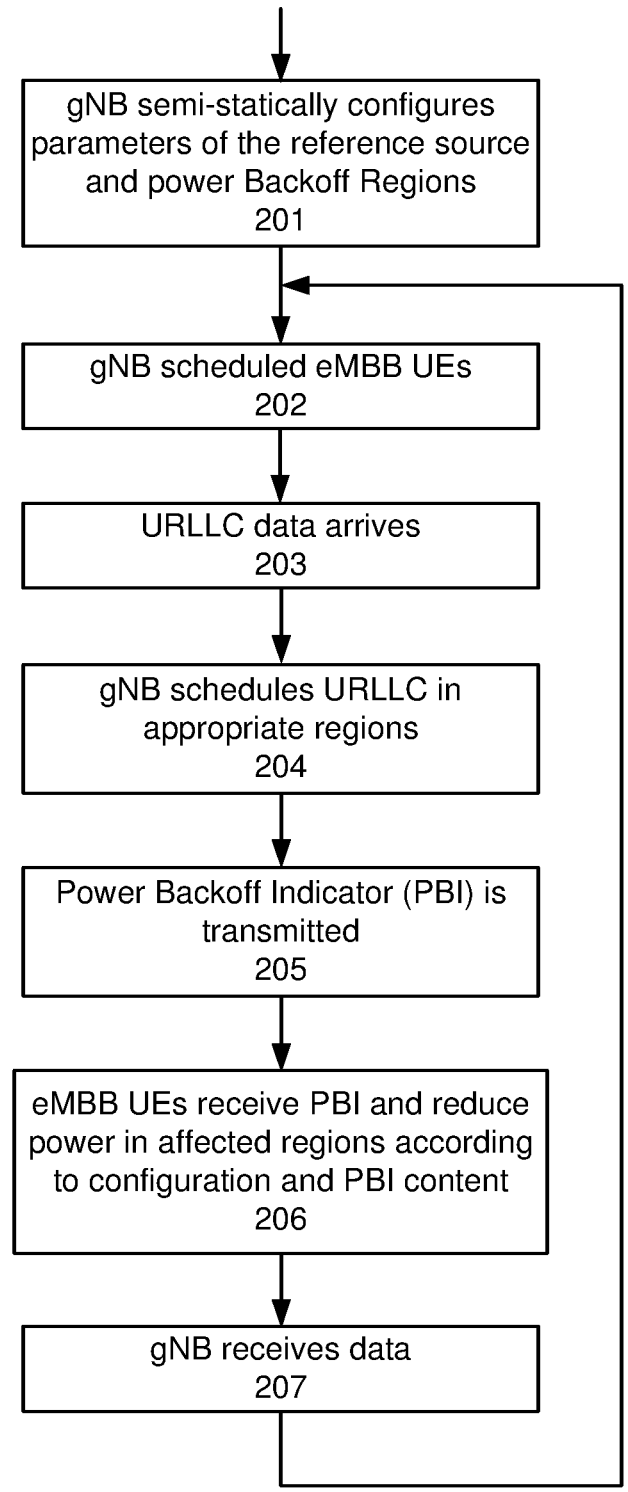
FIG. 2 is a flow chart illustrating a method.

FIG. 2 is a signalling diagram illustrating an example method. FIG. 2 may be described as illustrating a method for configuration of power backoff regions to reception of the power backoff indicator. FIG. 2 uses the gNB as an example of the first network node 103, but any other first network node 103 is equally applicable such as e.g. the eNB, NB etc. FIG. 2 also uses the eBB UE 101 as an example, but any other UE 101 is equally applicable. The method comprises at least one of the following steps, which steps may be performed in any suitable order than described below:

Step 201

The first network node 103 may at least semi-statically configure parameters of the reference resource and/or the power backoff regions.

Step 202

The first network node 103 may schedule one or multiple UEs 101.

Step 203

The URLLC data may arrive at the first network node 103.

Step 204

The first network node 103 schedules URLLC in appropriate regions.

Step 205

One or multiple power backoff indicators are determined and transmitted from the first network node 103 to the UE 101.

Step 206

The UE 101 may receive the power backoff indicator from the first network node 103, and reduces power in affected regions according to the configuration in step 201 and the PBI content.

Step 207

The UE 101 may send data to the first network node 103, and the first network node 103 may receive data from the UE 101.

After having received the data from the UE 101, the first network node 103 may proceed to perform step 202 again.

Figure 3:
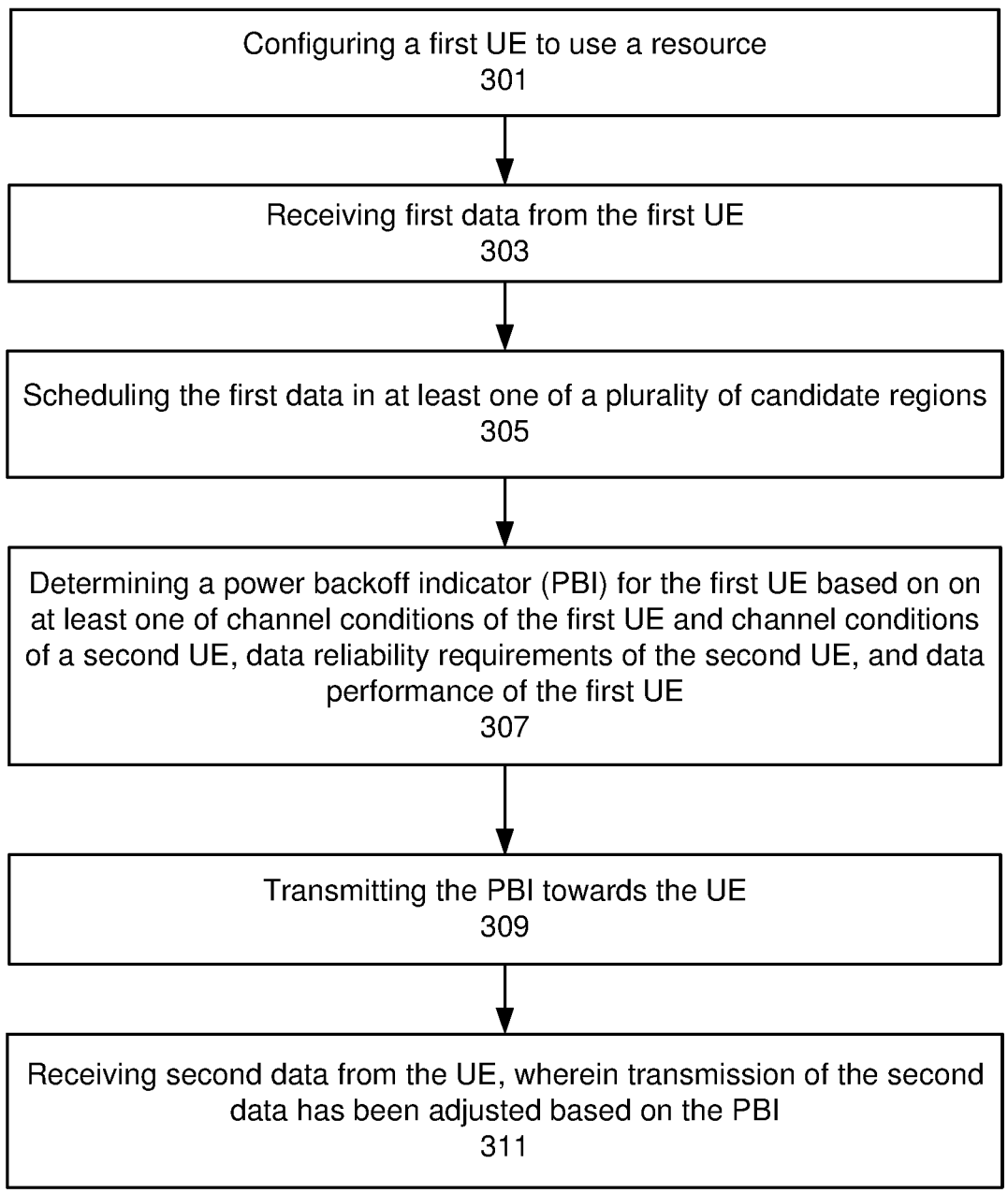
FIG. 3 is a flowchart illustrating operations of a network node according to some embodiments of inventive concepts.

FIG. 3 illustrates the steps taken by the first network node 103.

Step 301

The first network node 103 configures a UE (101) to use a resource. This step may be similar to step 202.

Step 303

The first network node 103 receives first data from the UE. This step may be similar to step 203.

Step 305

The first network node 103 schedules the first data in at least one of a plurality of candidate regions. Thus, the PBI indicates a power back-off for UEs in a candidate region of a plurality of candidate regions where each candidate region is configured with a power back-off value that UEs must apply when the UE is transmitting on a resource overlapping the candidate region. The candidate regions in some embodiments can be preconfigured power backoff regions such as the preconfigured power backoff regions illustrated in FIG. 5. This step may be similar to step 204.

Step 307

The first network node 103 may determine a power backoff indicator, PBI, for the UE based on at least one of channel conditions of the first UE and channel conditions of a second UE, data reliability requirements of the second UE, and data performance of the first UE. This step may be similar to step 205.

Step 307

The first network node 103 transmits the PBI in a PBI message towards the first UE (101). This step may be similar to step 205.

Step 309

The first network node 103 receives second data from the first UE, wherein transmission of the second data has been adjusted based on the PBI. The adjustment by the UE may be similar to step 206. The receiving of second data may be similar to step 207.

Figure 4:
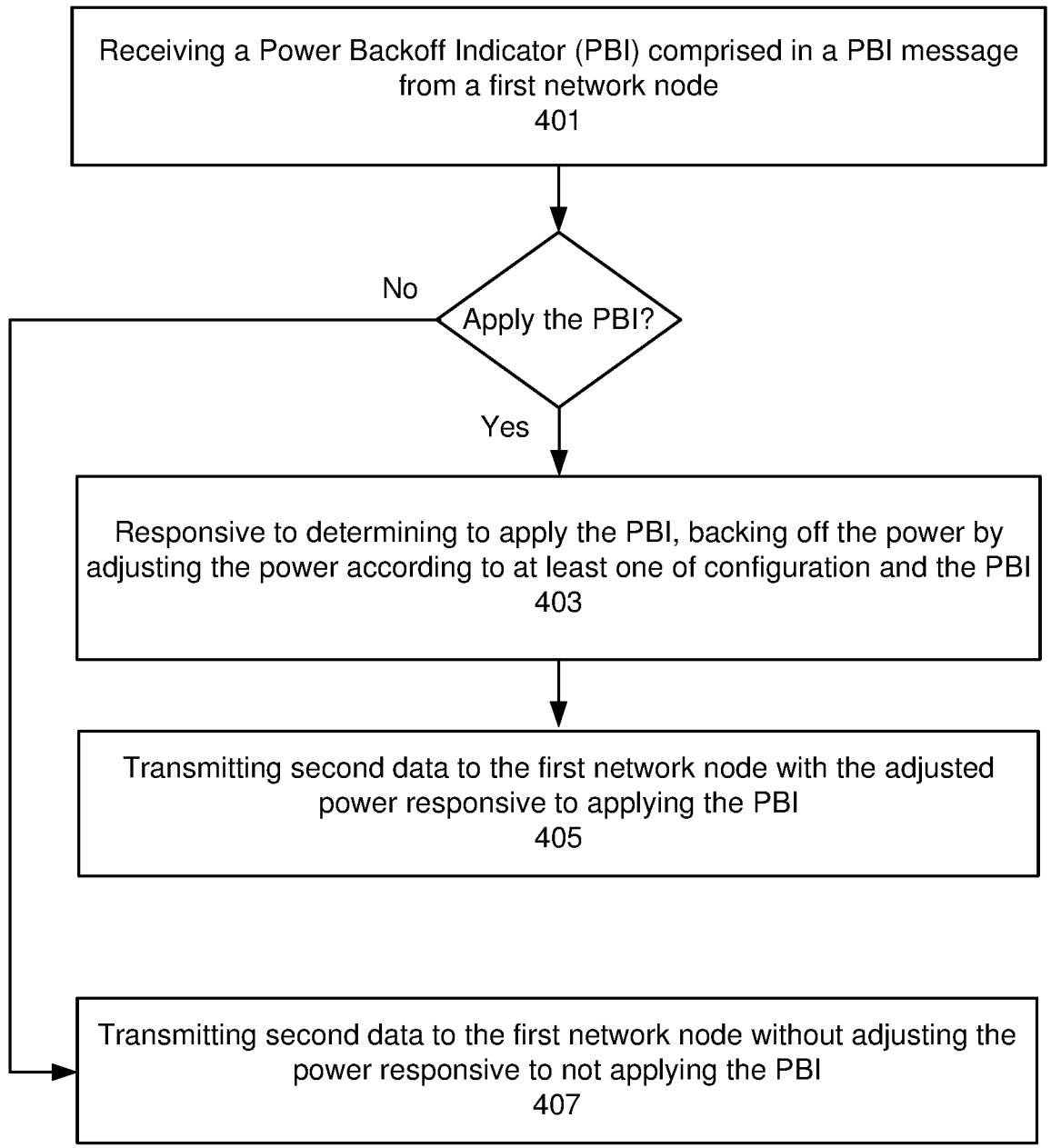
FIG. 4 is a flowchart illustrating operations of a UE according to some embodiments of inventive concepts.

FIG. 4 illustrates the steps taken by the UE 101.

Step 401

The UE (101) receives a Power Backoff Indicator, PBI, comprised in a PBI message from a first network node (103).

Step 403

The UE (101), responsive to determining to apply the PBI, backs off the power by adjusting the power according to at least one of a configuration and the PBI.

Step 405

The UE (101) transmits second data to the first network node with the adjusted power responsive to applying the PBI.

Step 407

The UE (101) transmits second data to the first network node (103) without adjusting the power responsive to not applying the PBI.

Further details on various embodiments of inventive concepts are discussed below.

Overview

Figure 5:
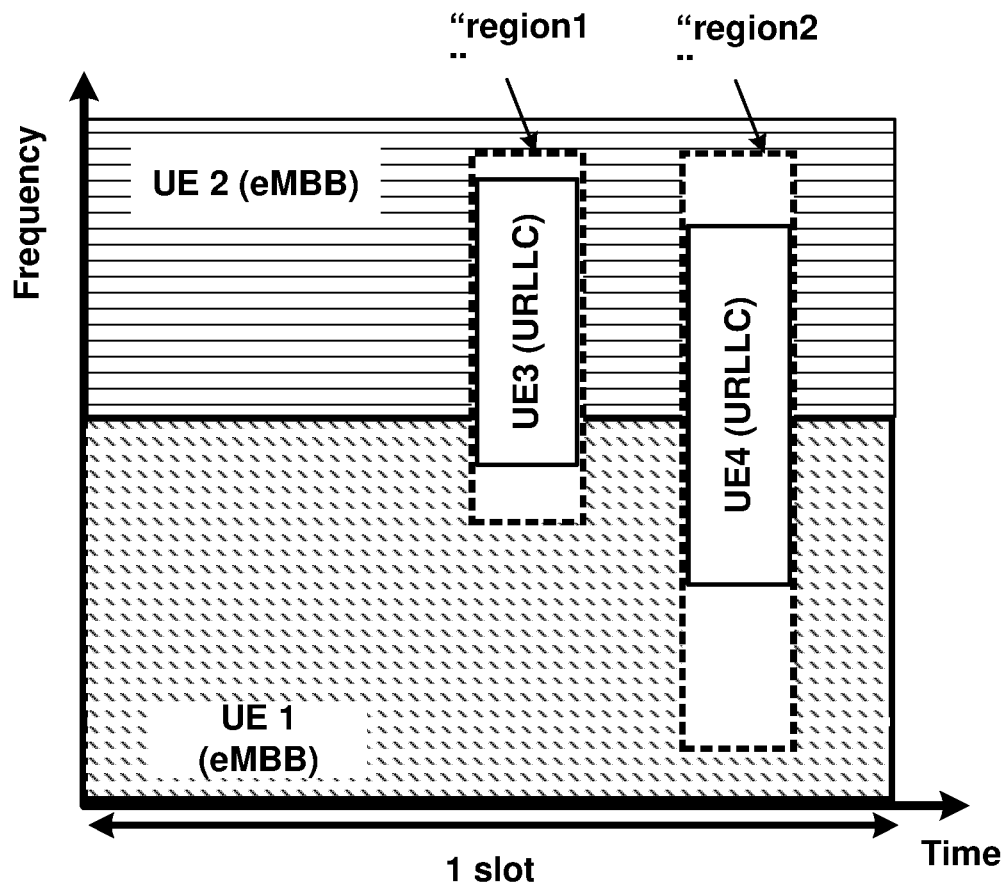
FIG. 5 is a graph illustrating scheduling of data.

FIG. 5 shows an example where URLLC are scheduled inside the preconfigured power backoff regions ("region1" and "region2"). Within these regions the eMBB UEs will reduce their transmit PSD according to the configuration. The x-axis of FIG. 5 represents time and the y-axis of FIG. 5 represents frequency.

In the example in FIG. 5, two Power Backoff Regions are configured. The first region, denoted "region1" is configured with a power backoff equal to "infinity", which corresponds to preemption. For the second region, denoted "region2" a power backoff equal to 10 dB is configured.

UE 1 and UE 2 has been scheduled on all OFDM symbols in the slot and together utilize all available PRBs. Hence, when this happens and URLLC data arrives for UE 3 there are no available resources for scheduling. If the UE 3 has relatively poor propagation conditions, the gNB can decide that preemption is required to maintain URLLC reliability, and UE 3 is therefore scheduled in "region1".

UE 4 has better propagation conditions, so when UE 4 is scheduled, the gNB decides based on the instantaneous channel conditions for both the eMBB UEs and the URLLC UE, that a 10 dB backoff is sufficient to maintain URLLC reliability. UE 4 can therefore be scheduled in "region2".

When UE1 and UE 2 receive the Power Backoff Indicator (PBI), the power spectral density of the resource elements that overlap with a Power Backoff Region is reduced according to the configuration of the respective region. Resources elements carrying data and demodulation reference symbols are power controlled equally.

Below is the modification of the PUSCH power control equation (specified in TS 38.213, 7.1.1) that is applied for resource elements overlapping with a power backoff region.

Here $P_{BO}$ corresponds to the powerBackoff for a given region in the power backoff indicator configuration.

$$P_{PUSCH,b,f,c}(i, j, q_d, 1) = \min\left\{\begin{array}{l}P_{CMAX,f,c}(i), \\ P_{O\_PUSCH,b,f,c}(j) - P_{BO} + 10\log_{10}(2^\mu \cdot M_{RB,b,f,c}^{PUSCH}(i)) + \\ \alpha_{b,f,c}(j) \cdot PL_{b,f,c}(q_d) + \dots\end{array}\right\}$$

UE3 may also listen to the power backoff indicator, but since its transmission is completely contained within "region1" UE3 determine that its transmission is not addressed by the power backoff indicator.

The embodiments herein may be summarized as follows. First, the first network node 103 may be able to signal "region(s)" in reference resource on time-frequency grid. Secondly, the power backoff values may be signaled to the UE as well. At third, the UE behavior has to be defined.

Reference Resource

The power backoff region may comprise of resource elements on OFDM time frequency grid, but for correct placement of region in time yet another term "reference resource" needs to be introduced. A reference resource typically spans across whole bandwidth or bandwidth part in frequency domain and either repeats with defined periodicity in time domain or has relative time positions to signaling message or other events. In terms of this invention, the power backoff region is a subset of the reference resource and is needed for finer resolution of power backoff procedure in time-frequency scale. For example, in FIG. 5 the reference resource spans across one slot in time and full BWP in frequency.

In one embodiment, the reference resource has configurable periodicity in time and/or configurable size in time domain.

In another embodiment, a position of reference resource in time is relative to power backoff message reception.

In another embodiment, a position of reference resource in time is signaled in power backoff indicator such that the reference resource starts at slot n+K if the indicator comes at slot n and contains value K in slots. n and K are positive integers.

In another embodiment, the reference resource is defined per carrier. For example, there can be several reference resources signaled if there are several carriers available.

Power Backoff Region

In one embodiment, the region is defined in frequency domain as a set of PRBs and in time domain as a set of symbols within reference resource.

In another embodiment the set of PRBs and symbols are consecutive and are defined using a startPRB and startSymbol together with number of PRBs and number of symbols, respectively.

In another embodiment, a set of PRBs can be defined as a fraction of cell bandwidth or BWP, e.g. full bandwidth, half-bandwidth or quarter of bandwidth etc.

In another embodiment, a set of symbols can be defined as a bitmap for reference resource, where one bit may indicate a presence of one or more OFDM symbols in set. For example, the bitmap can be 14-bits long and reference resource can be one slot 14os long which means one bit corresponds to one symbol. Another example is when reference resource comprises two slots which mean a one bit corresponds to two symbols.

Statically and Semi-Statically Configured Power Backoff Regions

Static or semi-static configuration of power backoff region(s) is mainly needed to decrease signaling message size by sending only region index.

In one embodiment power backoff regions are statically defined in any documents or 3GPP specification. As an example of this, see Table 1.

TABLE 1

Example of defined regions

| Index | "Description" | Frequency domain | Time domain |
|---|---|---|---|
| 0 | "region0" | Full BWP | 7-9 symbols |
| 1 | "region1" | Full BWP | 10-13 symbols |
| 3 | "region2" | First half of BWP | 7-13 symbols |
| 4 | "region3" | Second half of BWP | 7-13 symbols |

The left most column in Table 1 represents index, the middle left column represent a description, the right middle column represent frequency domain and the right most column represents the time domain.

In another embodiment one or plurality of power backoff regions are semi-statically configured by any method described above in the Reference resource section.

In one embodiment, multiple regions are semi-statically configured as entries in a table, e.g. see Table 1.

In another embodiment, one or more regions are defined either only in frequency domain or only in time domain, while explicit signaling is used to signal unconfigured domain information.

Dynamic Indication of Power Backoff Region Parameters

Another option is to explicitly signal the resource, together with the associated power backoff value. This gives a much more flexible solution at the cost of a larger payload size for the Power Backoff Indication signal. With this solution the maximum number of regions that can be signaled could for example be fixed by specification or semi-statically configured but where the parameters for each region could be dynamically signaled.

In this embodiment, methods of power backoff region definition from hereinabove are reused and parameters, related to every method, are signaled explicitly in PBI.

Power Backoff Value Indication and Signaling Aspects

In one embodiment, the power backoff values are semi-statically configured wherein the power backoff indicated to UE is referencing an entry in a semi-statically configured table of power backoff values as illustrated in Table 2.

TABLE 2

Power backoff indicator table

| Power backoff indicator | "Description" |
|---|---|
| 00 | "backoff value1" |
| 01 | "backoff value2" |
| 10 | "backoff value3" |
| 11 | "backoff value4" |

The left column in Table 2 represents the power backoff indicator and the right column represents a description.

In some embodiments the resource and power backoff are indicated jointly with a resourceAndPowerBackoff indicator referencing an entry in a Resource and power backoff indicator table, e.g. joining Table 1 and Table 2.

For the case with a one-bit Power Backoff value per region this can be signaled in the following way:

```
PowerBackoffIndicator =
{
  block1 = {
    resource = "region1"
    powerBackoff = "infinity"
  },
  block2 = {
    resource = "region2"
    powerBackoff = "10db"
  }
}
```

Here, the powerBackoff corresponds to the backoff the UE applies when the bit corresponding to a given block is set. When the corresponding bit is cleared no power backoff is applied.

The Power backoff value in PBI may comprise more than one bit. In this case one can configure relations between bit field value and power backoff value (Table 2). As an example, for a two-bits Power Backoff values it can be signaled like this:

```
PowerBackoffIndicator =
{
  block1 = {
    resource = "region1"
    powerBackoff = {"3db", "6db", "infinity"}
  },
  block2 = {
    resource = "region2"
    powerBackoff = {"3db", "6db", "10db"}
  }
}
```

This way of signaling the backoff is more flexible but also requires a larger Power Backoff value field, which for example corresponds to a larger DCI payload.

Semi-Statically Configuration

In some embodiments one or multiple sets of both power backoff region and corresponding power backoff value are semi-statically configured.

In some embodiments, the configured power backoff value includes a value (e.g. infinity) corresponding to stopping the (ongoing) transmission.

In another embodiment, the power backoff value can be signaled in form of TPC command. The special value "infinity" can be associated with one of the bits in the set.

PBI Message Content and Details

In one embodiment the power backoff indicator is sent as a group common DCI message, where a group of UEs are configured to listen to the same message.

In another embodiment the power backoff indicator is sent as a UE specific DCI message.

In yet another embodiment the power backoff indicator is sent as a sequence of modulation symbols (PUCCH-like).

In yet another embodiment the power backoff that includes some payload is sent as a sequence out of a set of possible sequences, where each combination of payload bits corresponds to one sequence.

In one embodiment the power backoff contains one bit and when set enables the power backoff in that region.

In another embodiment multiple power backoffs are configured for a region. These power backoffs can be address using a PBI message with multiple code points for each region, where each code point maps to one power backoff value.

In case of multiple regions are configured, the power backoff indicator can be a one-bit indicator to enable or disable the power backoff according to the configured values for all regions.

In another embodiment the power backoff indicator in the DCI is a bit field with length equal to the number of configured sets. Each bit in the bit field corresponds to an option to enable or disable power backoff for each region.

In one embodiment the power backoff indicator in the DCI indicates a power backoff value to be used for one or multiple regions.

In one embodiment the timing of the power backoff indicator DCI message indicates which region that is addressed.

In one embodiment, the PBI message comprises a UE identity within the group (group of UEs receiving the PBI message) for each of indicated regions. The UE identity may indicate the UE that is causing that power-backoff is needed for the region.

In one embodiment the power backoff indicator in the DCI indicates both power backoff region (time and/or frequency resources) and power backoff value.

In one embodiment the DCI containing the power backoff indicator includes a priority indicator.

UE Behavior when Receiving a Power Backoff Indicator (PBI)

In one embodiment a UE reduces its power spectral density of the resource elements that are transmitted within a region if a power backoff indicator is received.

In another embodiment a UE reduces its power spectral density at the start of a region and keeps the same power for the rest of the slot if a power backoff indicator is received. This embodiment includes the case when power backoff value is "infinity" which means UE stops ongoing transmission.

In one embodiment a UE reduces its power spectral density of resource elements overlapping with a power backoff region but increases its power spectral density on non-overlapping resource elements keeping its total transmit power unchanged.

In one embodiment a UE with an allocation fully overlapping with a Power Backoff Region shall disregard the power backoff indicator and transmit without backoff.

In one embodiment a UE that receives both a PDCCH with an uplink grant and a PDCCH with a power backoff indicator, and for which the PDCCH CORESETs have the same starting symbol shall disregard the power backoff indicator and transmit without backoff.

In one embodiment a UE can be scheduled partly overlapping with a power backoff region but will in this case experience interference with higher power on resource elements not overlapping with the power backoff region.

In one embodiment the power backoff indicator contains a bit that if set enables power backoff also for UEs that are fully overlapping with the power backoff region.

In one embodiment a UE receives a group common PBI message that contains some UE specific elements, where each UE in the group listens to one of these elements.

In one embodiment a UE receives a group common PBI message that contains a bit field and where each UE in the group enables preemption based on the bit on one preconfigured bit in this bit field.

In one embodiment the group common PBI message comprises one or more UE identities within the group for an indicated region. UEs with a UE identity within the group that is indicated for region and with a transmission that fully overlap with the region do not backoff power for said transmission.

Figure 6:
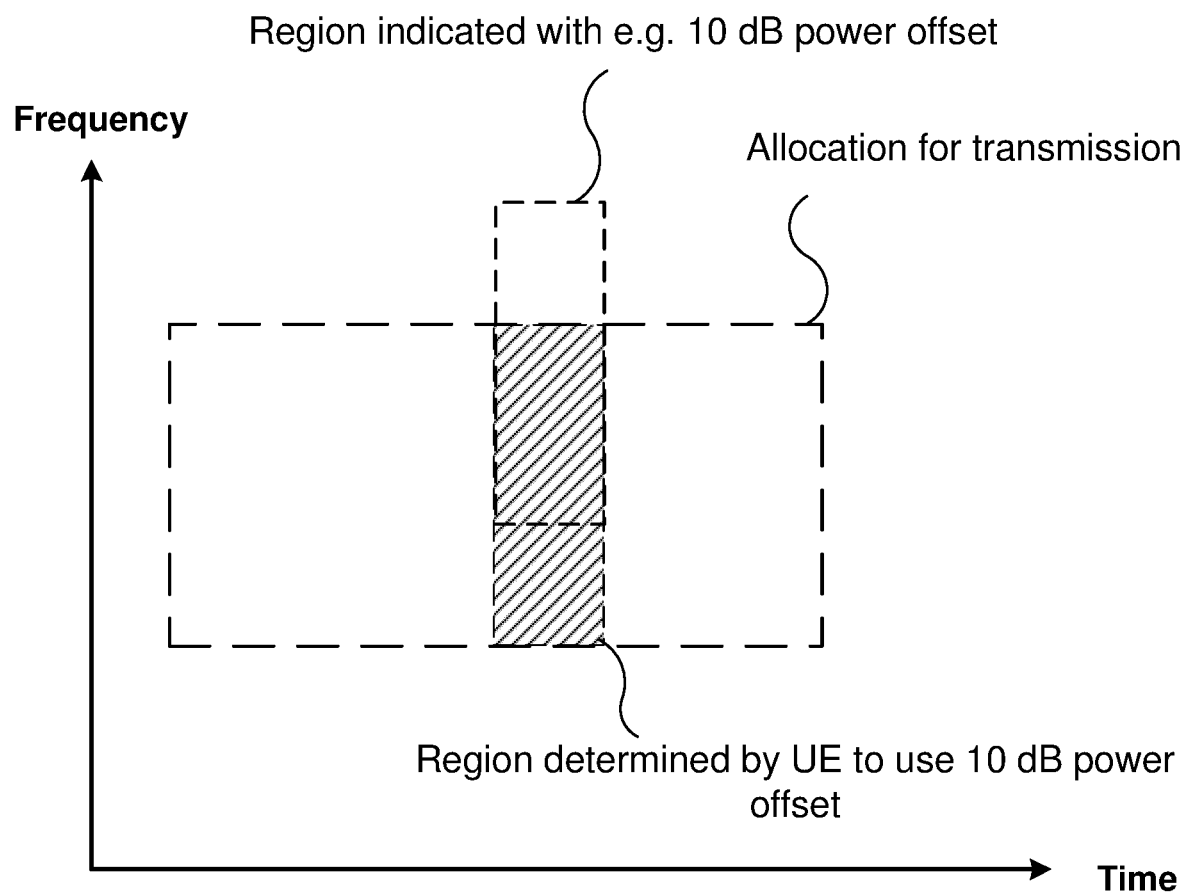
FIG. 6 is a diagram illustrating that a UE may only be capable of backoff the power in time-domain.

In one embodiment, UE when receiving a PBI message indicating that said UE shall backoff power for its transmission in a first time-frequency region the UE may based on its capability determine a second time-frequency region where it applies power backoff for said transmission. In such embodiment, the UE may only be capable of backoff the power in time-domain as illustrated in FIG. 6. FIG. 6 shows an example of UE based determines a region based on its capability and the region indicated in PBI. The x-axis of FIG. 6 represents time and the y-axis represents frequency. The shaded region in FIG. 6 represents a region determined by the UE to use 10 dB power offset. The horizontally laying dotted rectangle represents the allocation for transmission, and the standing vertical dotted rectangle represents the region indicated with e.g. 10 dB power offset.

Figure 7:
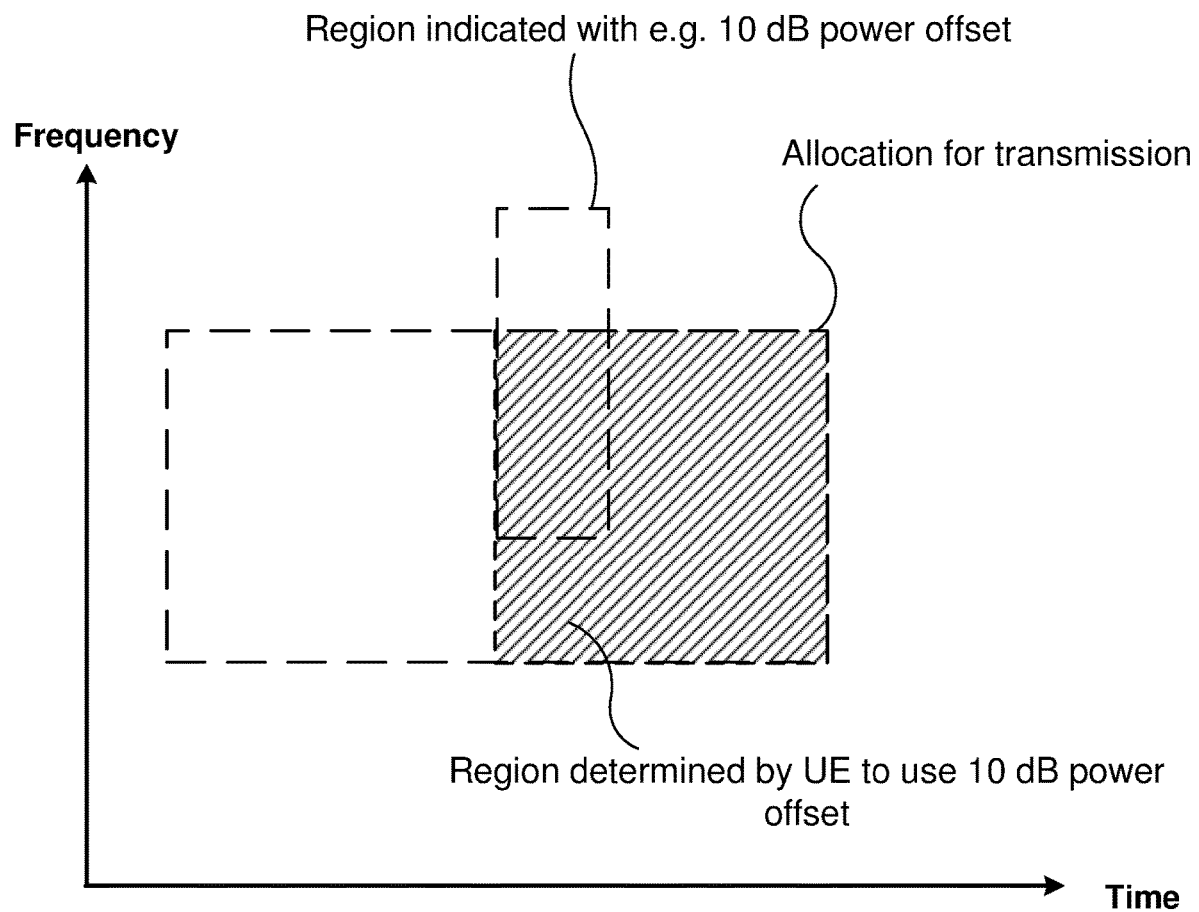
FIG. 7 is a diagram illustrating that a UE is not capable of resuming the power in symbols after region indicated.

FIG. 7 illustrates where a UE is not capable of resuming the power in symbols after region indicated. In other words, FIG. 7 shows a UE determines a region based on its capability and the region indicated in PBI. The x-axis of FIG. 7 represents time and the y-axis of FIG. 7 represents frequency. The shaded square in FIG. 7 represents a region determined by the UE to user 10 dB power offset. The outer laying rectangular and laying dotted box represents allocation for transmission. The standing dotted rectangle represents the region indicated with e.g. 10 dB power offset.

In one embodiment, if the DCI containing power backoff indicator and/or the DCI scheduling/activating PUSCH transmission include also priority information (e.g., in the form of priority indicator), whether the power backoff is applied to the UE depends on the priorities of the DCI containing the power backoff indicator and/or the priority of the PUSCH transmission. In case that priority information is available only in the DCI scheduling/activating PUSCH, if the UE receives power backoff indicator and the PUSCH's priority is higher than a certain threshold, the UE neglects the power backoff indicator. In another case, if priority information is available in both DCI scheduling/activating PUSCH and DCI indicating power backoff, the UE who receives the power backoff indicator applies the power backoff only when power backoff's priority is higher than PUSCH's priority.

A computer program may comprise instructions which, when executed on at least one processor, cause the at least one processor to carry out the method according to any one of embodiments herein. A carrier may comprise the computer program, wherein the carrier is one of an electronic signal, optical signal, radio signal or computer readable storage medium.

Figure 8A:
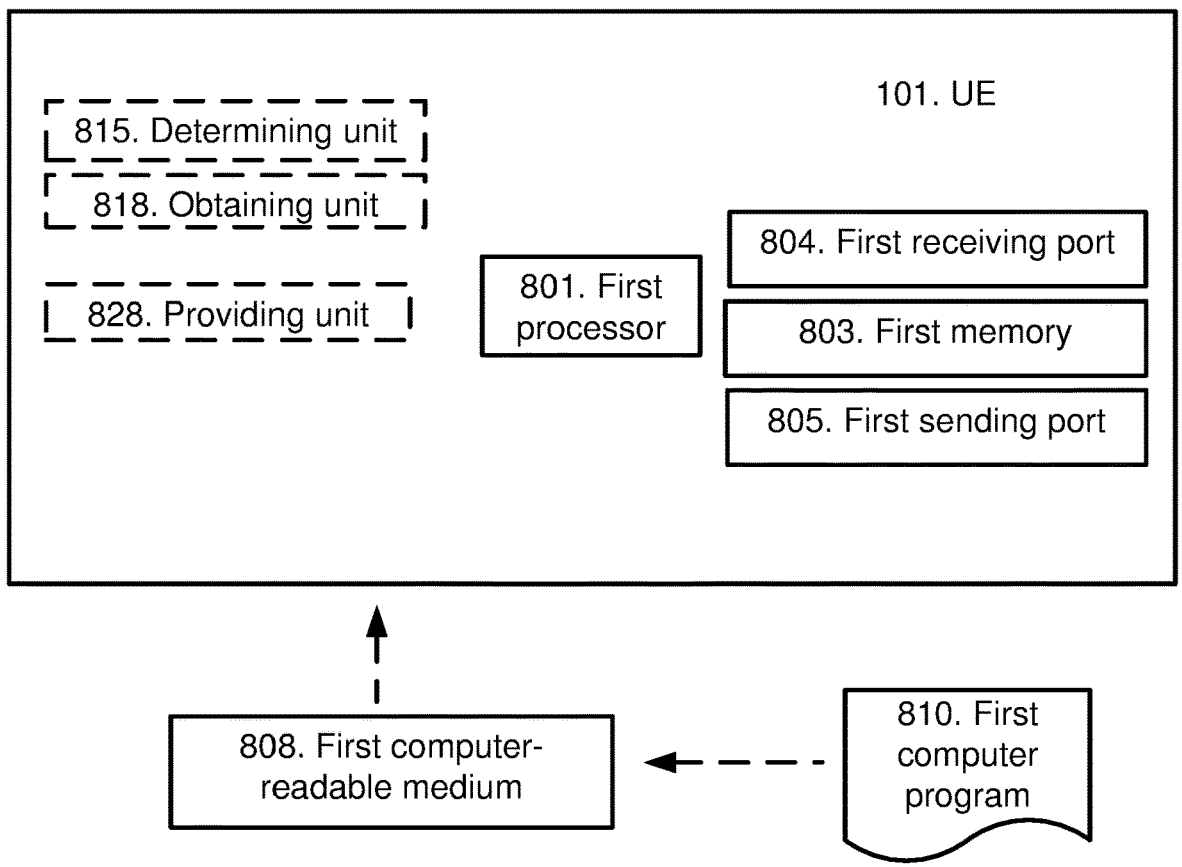
FIG. 8*a* is a schematic drawing illustrating an example of a UE.
Figure 8B:
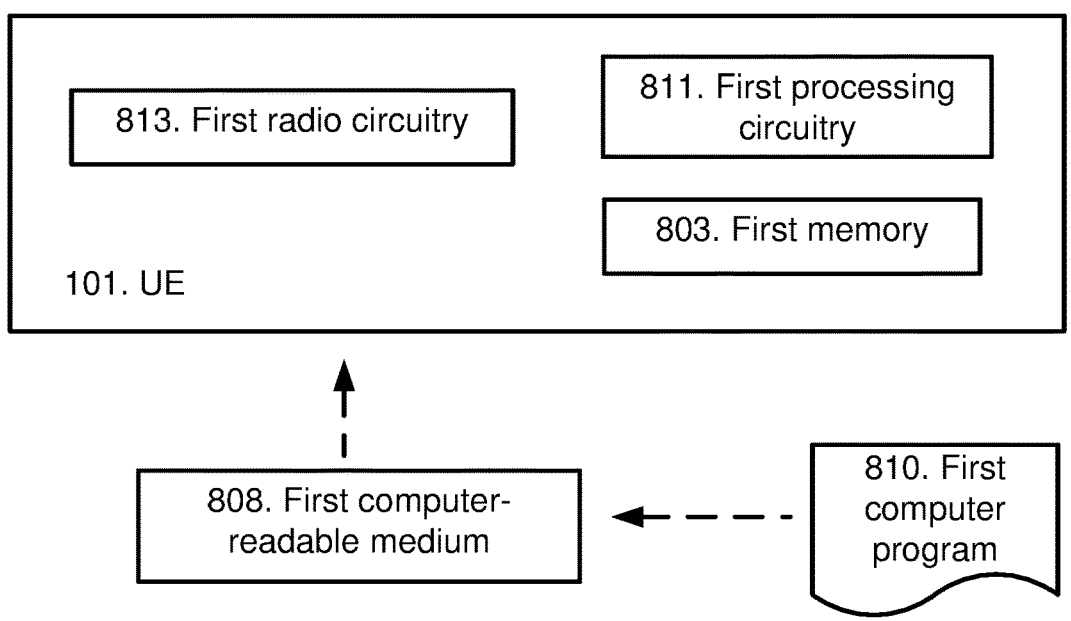
FIG. 8*b* is a schematic drawing illustrating an example of a UE.

FIG. 8a and FIG. 8b depict two different examples in panels a) and b), respectively, of the arrangement that the UE 101 may comprise. In some embodiments, the UE 101 may comprise the following arrangement depicted in FIG. 8a.

The embodiments herein in the UE 101 may be implemented through one or more processors, such as a first processor 801 in the UE 101 depicted in FIG. 8a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the UE 101. One such carrier may be in the form of a CD ROM disc. It is however feasible with other data carriers such as a memory stick. The computer program code may furthermore be provided as pure program code on a server and downloaded to the UE 101.

The UE 101 may further comprise a first memory 803 comprising one or more memory units. The first memory 803 is arranged to be used to store obtained information, store data, configurations, schedulings, and applications etc. to perform the methods herein when being executed in the UE 101.

In some embodiments, the UE 101 may receive information from, e.g. the first network node 103 and/or the second network node 105, through a first receiving port 804. In some embodiments, the first receiving port 804 may be, for example, connected to one or more antennas in UE 101. In other embodiments, the UE 101 may receive information from another structure in the communications system 100 through the first receiving port 804. Since the first receiving port 804 may be in communication with the first processor 801, the first receiving port 804 may then send the received information to the first processor 801. The first receiving port 804 may also be configured to receive other information.

The first processor 801 in the UE 101 may be further configured to transmit or send information to e.g. first network node 103 and/or the second network node 105 and, or another structure in the communications system 100, through a first sending port 805, which may be in communication with the first processor 801, and the first memory 803.

The UE 101 may comprise a determining unit 815, an obtaining unit 818, a providing unit 828, etc.

Those skilled in the art will also appreciate that the determining unit 815, obtaining unit 818, a providing unit 828 described above may refer to a combination of analog and digital circuits, and/or one or more processors configured with software and/or firmware, e.g., stored in memory, that, when executed by the one or more processors such as the first processor 801, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 815-828 described above may be implemented as one or more applications running on one or more processors such as the first processor 801.

Thus, the methods according to the embodiments described herein for the UE 101 may be respectively implemented by means of a first computer program 810 product, comprising instructions, i.e., software code portions, which, when executed on at least one first processor 801, cause the at least one first processor 801 to carry out the actions described herein, as performed by the UE 101. The first computer program 810 product may be stored on a first computer-readable storage medium 808. The first computer-readable storage medium 808, having stored thereon the first computer program 810, may comprise instructions which, when executed on at least one first processor 801, cause the at least one first processor 801 to carry out the actions described herein, as performed by the UE 101. In some embodiments, the first computer-readable storage medium 808 may be a non-transitory computer-readable storage medium, such as a CD ROM disc, or a memory stick. In other embodiments, the first computer program 810 product may be stored on a carrier containing the first computer program 810 just described, wherein the carrier is one of an electronic signal, optical signal, radio signal, or the first computer-readable storage medium 808, as described above.

The UE 101 may comprise a communication interface configured to facilitate communications between the UE 101 and other nodes or devices, e.g., the first network node 103 and/or the second network node 105 and/, or another structure. The interface may, for example, include a transceiver configured to transmit and receive radio signals over an air interface in accordance with a suitable standard.

In other embodiments, the UE 101 may comprise the following arrangement depicted in FIG. 8b. The UE 101 may comprise a first processing circuitry 811, e.g., one or more processors such as the first processor 801, in the UE 101 and the first memory 803. The UE 101 may also comprise a first radio circuitry 813, which may comprise e.g., the first receiving port 804 and the first sending port 805. The first processing circuitry 811 may be configured to, or operable to, perform the method actions according to FIGS. 2 and 4, in a similar manner as that described in relation to FIG. 8a. The first radio circuitry 813 may be configured to set up and maintain at least a wireless connection with the UE 101. Circuitry may be understood herein as a hardware component.

Hence, embodiments herein also relate to the UE 101 operative to operate in the communications system 100. The UE 101 may comprise the first processing circuitry 811 and the first memory 803, said first memory 803 containing instructions executable by said first processing circuitry 811, whereby the UE 101 is further operative to perform the actions described herein in relation to the UE 101, e.g., in FIGS. 2 and 4.

Figure 9A:
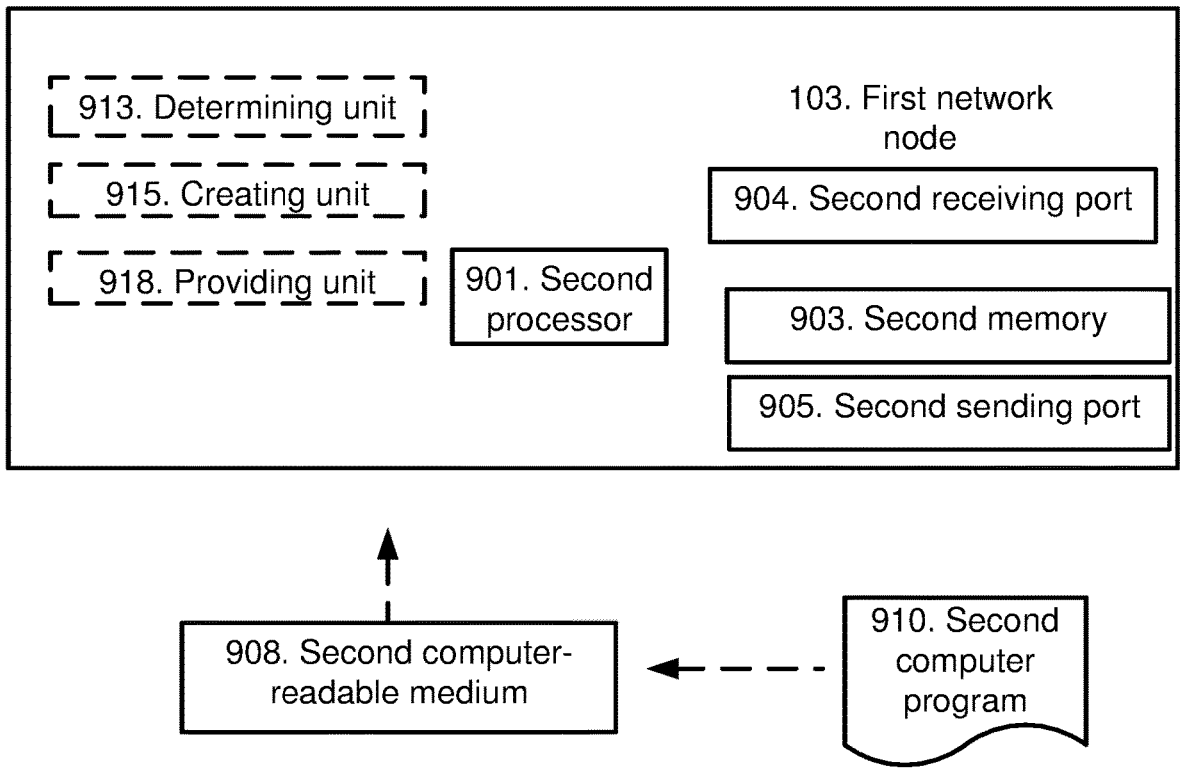
FIG. 9*a* is a schematic drawing illustrating an example of a first network node.
Figure 9B:
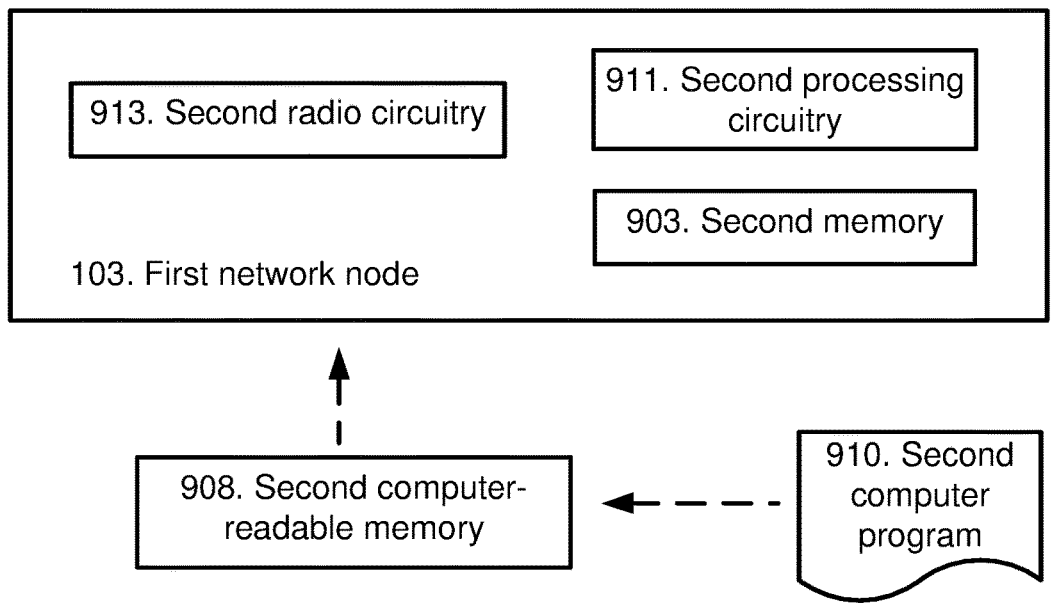
FIG. 9*b* is a schematic drawing illustrating an example of a first network node.

FIGS. 9a and FIG. 9b depict two different examples in panels a) and b), respectively, of the arrangement that the first network node 103 may comprise. In some embodiments, the first network node 105 may comprise the following arrangement depicted in FIG. 9a.

The embodiments herein in the first network node 103 may be implemented through one or more processors, such as a second processor 901 in the first network node 103 depicted in FIG. 9a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first network node 103. One such carrier may be in the form of a CD ROM disc. It is however feasible with other data carriers such as a memory stick. The computer program code may furthermore be provided as pure program code on a server and downloaded to the first network node 103.

The first network node 103 may further comprise a second memory 903 comprising one or more memory units. The second memory 903 is arranged to be used to store obtained information, store data, configurations, schedulings, and applications etc. to perform the methods herein when being executed in the first network node 103.

In some embodiments, the first network node 103 may receive information from, e.g., the UE 101 and/or the second network node 105, through a second receiving port 904. In some embodiments, the second receiving port 904 may be, for example, connected to one or more antennas in first network node 103. In other embodiments, the first network node 103 may receive information from another structure in the communications system 100 through the second receiving port 904. Since the second receiving port 904 may be in communication with the second processor 901, the second receiving port 904 may then send the received information to the second processor 901. The second receiving port 904 may also be configured to receive other information.

The second processor 901 in the first network node 103 may be further configured to transmit or send information to e.g., the UE 101 and/or the second network node 105, or another structure in the communications system 100, through a second sending port 905, which may be in communication with the second processor 901, and the second memory 903.

The first network node 103 may comprise a determining unit 913, a creating unit 915, a providing unit 918 etc.

Those skilled in the art will also appreciate that the determining unit 913, the creating unit 915, the providing unit 918 etc. described above may refer to a combination of analog and digital circuits, and/or one or more processors configured with software and/or firmware, e.g., stored in memory, that, when executed by the one or more processors such as the second processor 901, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 913-918 described above may be implemented as one or more applications running on one or more processors such as the second processor 901.

Thus, the methods according to the embodiments described herein for the first network node 103 may be respectively implemented by means of a second computer program 910 product, comprising instructions, i.e., software code portions, which, when executed on at least one second processor 901, cause the at least one second processor 901 to carry out the actions described herein, as performed by the first network node 103. The second computer program 910 product may be stored on a second computer-readable storage medium 908. The computer-readable storage medium 908, having stored thereon the second computer program 910, may comprise instructions which, when executed on at least one second processor 901, cause the at least one second processor 901 to carry out the actions described herein, as performed by the network node 105. In some embodiments, the computer-readable storage medium 910 may be a non-transitory computer-readable storage medium, such as a CD ROM disc, or a memory stick. In other embodiments, the second computer program 910 product may be stored on a carrier containing the second computer program 910 just described, wherein the carrier is one of an electronic signal, optical signal, radio signal, or the second computer-readable storage medium 908, as described above.

The first network node 103 may comprise a communication interface configured to facilitate communications between the first network node 103 and other nodes or devices, e.g., the UE 101 and/or the second network node 105, or another structure. The interface may, for example, include a transceiver configured to transmit and receive radio signals over an air interface in accordance with a suitable standard.

In other embodiments, the first network node 103 may comprise the following arrangement depicted in FIG. 9b. The first network node 103 may comprise a second processing circuitry 911, e.g., one or more processors such as the second processor 901, in the first network node 103 and the second memory 903. The first network node 103 may also comprise a second radio circuitry 913, which may comprise e.g., the second receiving port 904 and the second sending port 905. The second processing circuitry 911 may be configured to, or operable to, perform the method actions according to FIGS. 2-3 in a similar manner as that described in relation to FIG. 9a. The second radio circuitry 913 may be configured to set up and maintain at least a wireless connection with the first network node 103. Circuitry may be understood herein as a hardware component.

Hence, embodiments herein also relate to the first network node 103 operative to operate in the communications system 100. The first network node 103 may comprise the second processing circuitry 913 and the second memory 903, said second memory 903 containing instructions executable by said second processing circuitry 913, whereby the first network node 103 is further operative to perform the actions described herein in relation to the first network node 103, e.g., in FIGS. 2-3.

Further Extensions And Variations

Telecommunication network connected via an intermediate network to a host computer in accordance with some embodiments.

Figure 10:
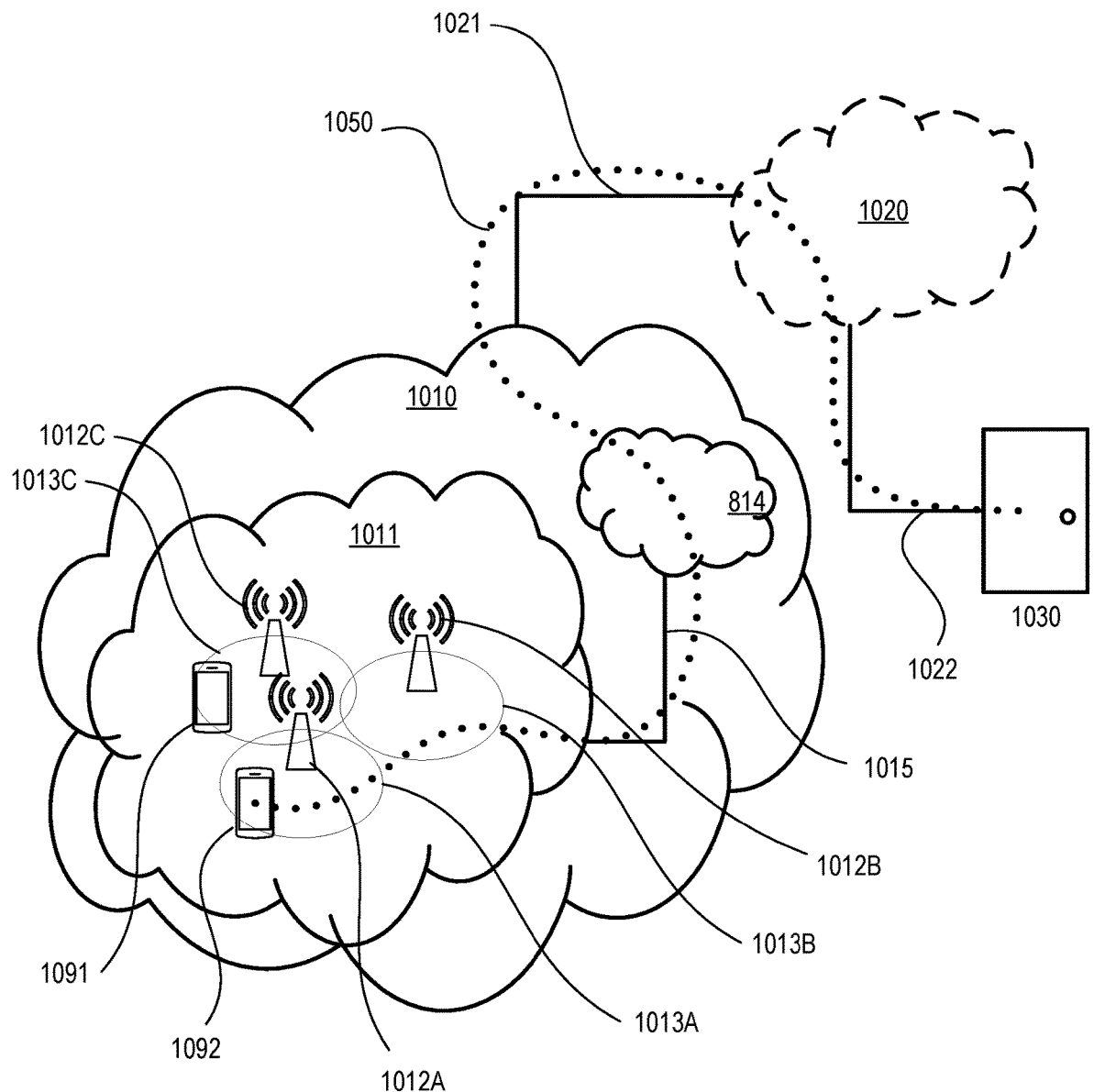
FIG. 10 is a schematic block diagram illustrating a telecommunication network connected via an intermediate network to a host computer.

With reference to FIG. 10, in accordance with an embodiment, a communication system includes telecommunication network 1010 such as the communications system 100, for example, a 3GPP-type cellular network, which comprises access network 1011, such as a radio access network, and core network 1014. Access network 1011 comprises a plurality of network nodes 105. For example, base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A plurality of user equipments, such as the UE 101 may be comprised in the communications system 100. In FIG. 10, a first UE 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012. Any of the UEs 1091, 1092 may be considered examples of the UE 101.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an Over-The-Top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 891 towards the host computer 830.

In relation to FIGS. 11-15 which are described next, it may be understood that the base station may be considered an example of the first network node 103.

Figure 11:
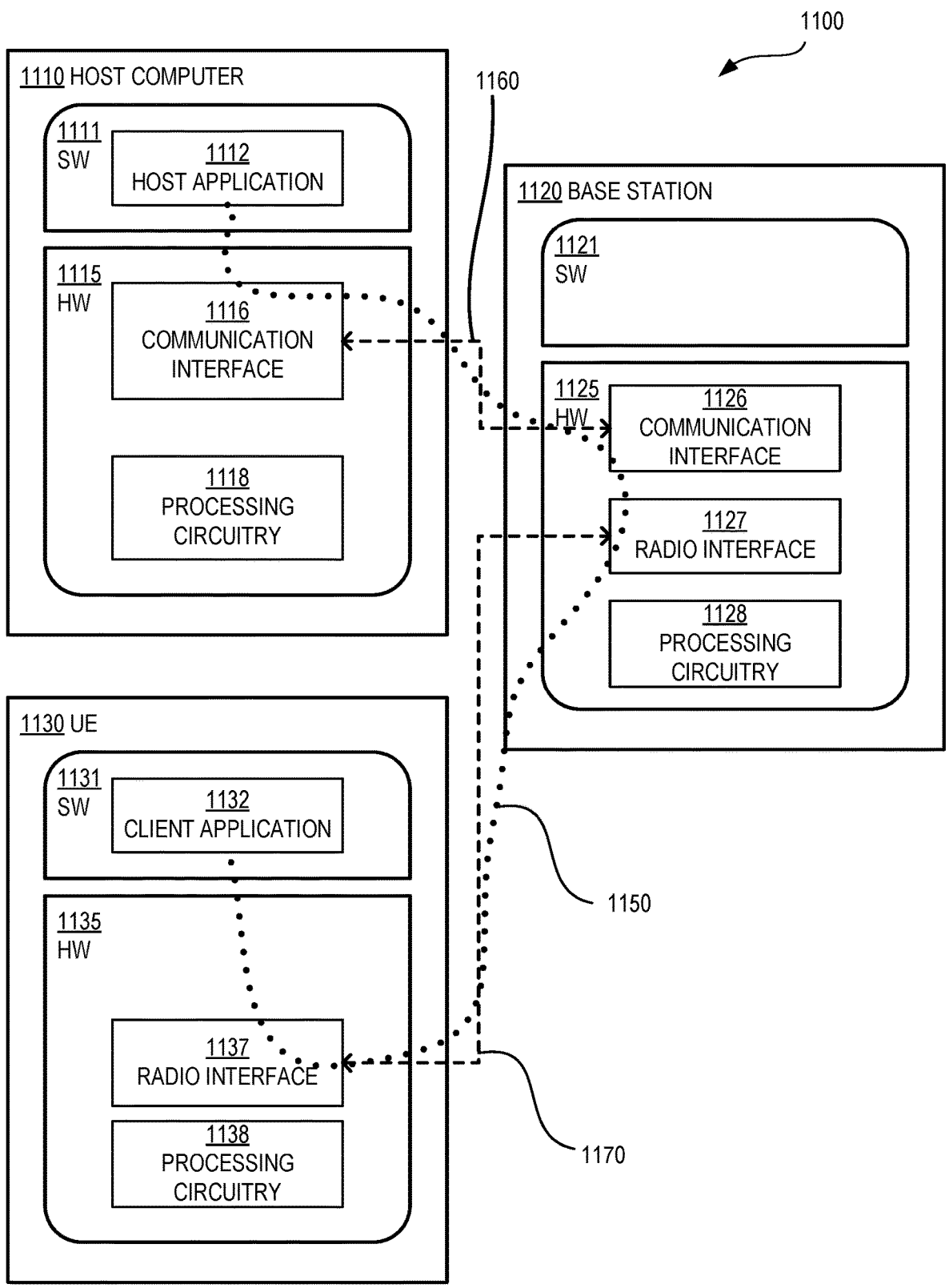
FIG. 11 is a schematic block diagram of a host computer communicating via a base station with a user equipment over a partially wireless connection.

FIG. 11 illustrates an example of host computer communicating via a first network node 103 with a UE 101 over a partially wireless connection in accordance with some embodiments The UE 101 and the first network node 103, e.g., a base station and host computer discussed in the preceding paragraphs will now be described with reference to FIG. 11. In communication system 1130, such as the communications system 100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes the first network node 103 exemplified in FIG. 11 as a base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with the UE 101, exemplified in FIG. 11 as a UE 1130 located in a coverage area served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. It's hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

It is noted that host computer 1110, base station 1120 and UE 1130 illustrated in FIG. 9 may be similar or identical to host computer 1030, one of base stations 1012a, 1012b, 1012c and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 970 forms the last segment. More precisely, the teachings of these embodiments may improve the spectrum efficiency, and latency, and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 911 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

Figures 12, 13:
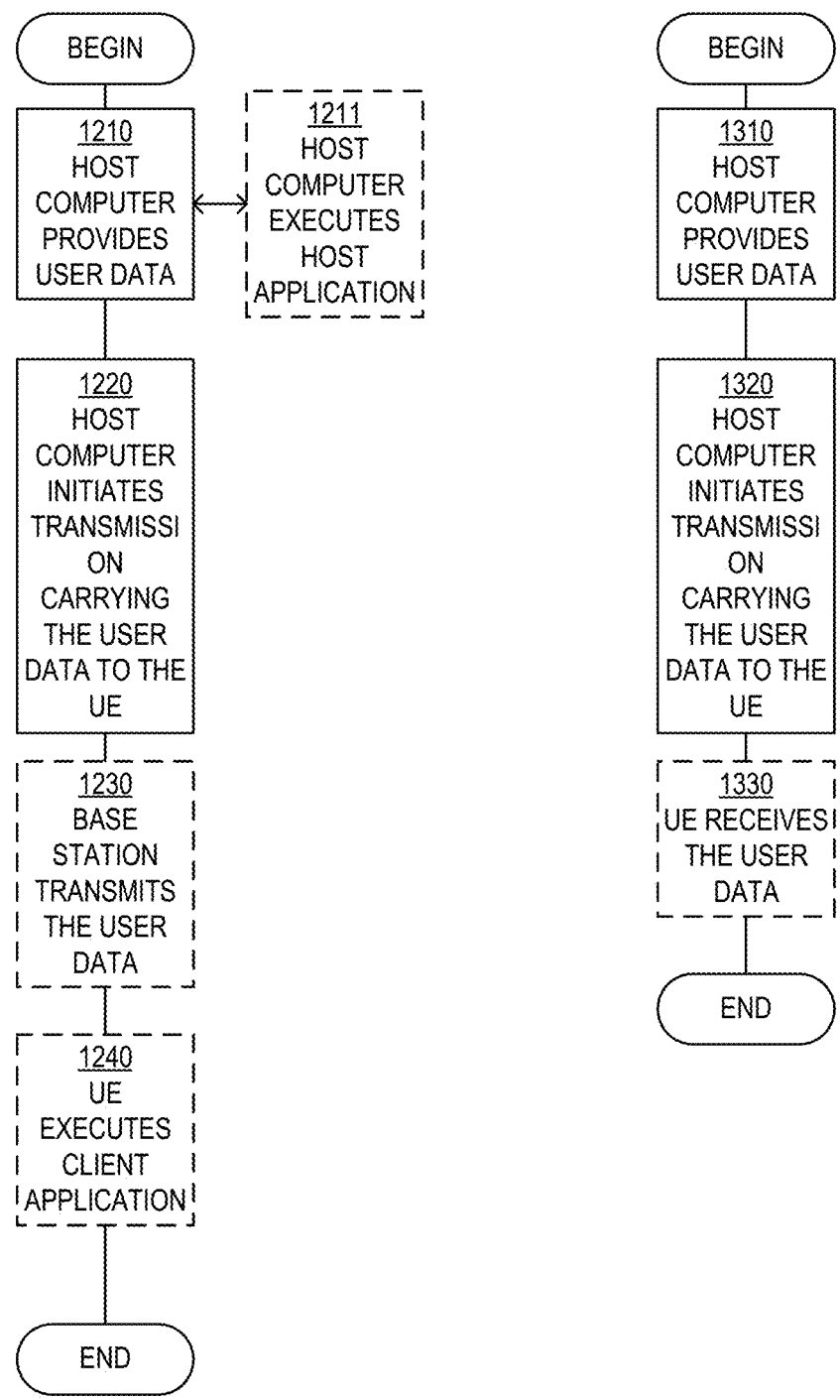
FIG. 12 is a flowchart depicting embodiments of a method in a communications system including a host computer, a base station and a user equipment.
FIG. 13 is a flowchart depicting embodiments of a method in a communications system including a host computer, a base station and a user equipment.

FIG. 12 illustrates an example of methods implemented in a communication system including a host computer, a base station and a user equipment. FIG. 12 is a flowchart illustrating a method implemented in a communication system. The communication system includes a host computer, a base station and a UE which may be those described with reference to FIG. 10 and FIG. 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

FIG. 13 illustrates methods implemented in a communication system including a host computer, a base station and a user equipment in accordance with some embodiments. FIG. 13 is a flowchart illustrating a method implemented in a communication system. The communication system includes a host computer, a base station and a UE which may be those described with reference to FIG. 10 and FIG. 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figures 14, 15:
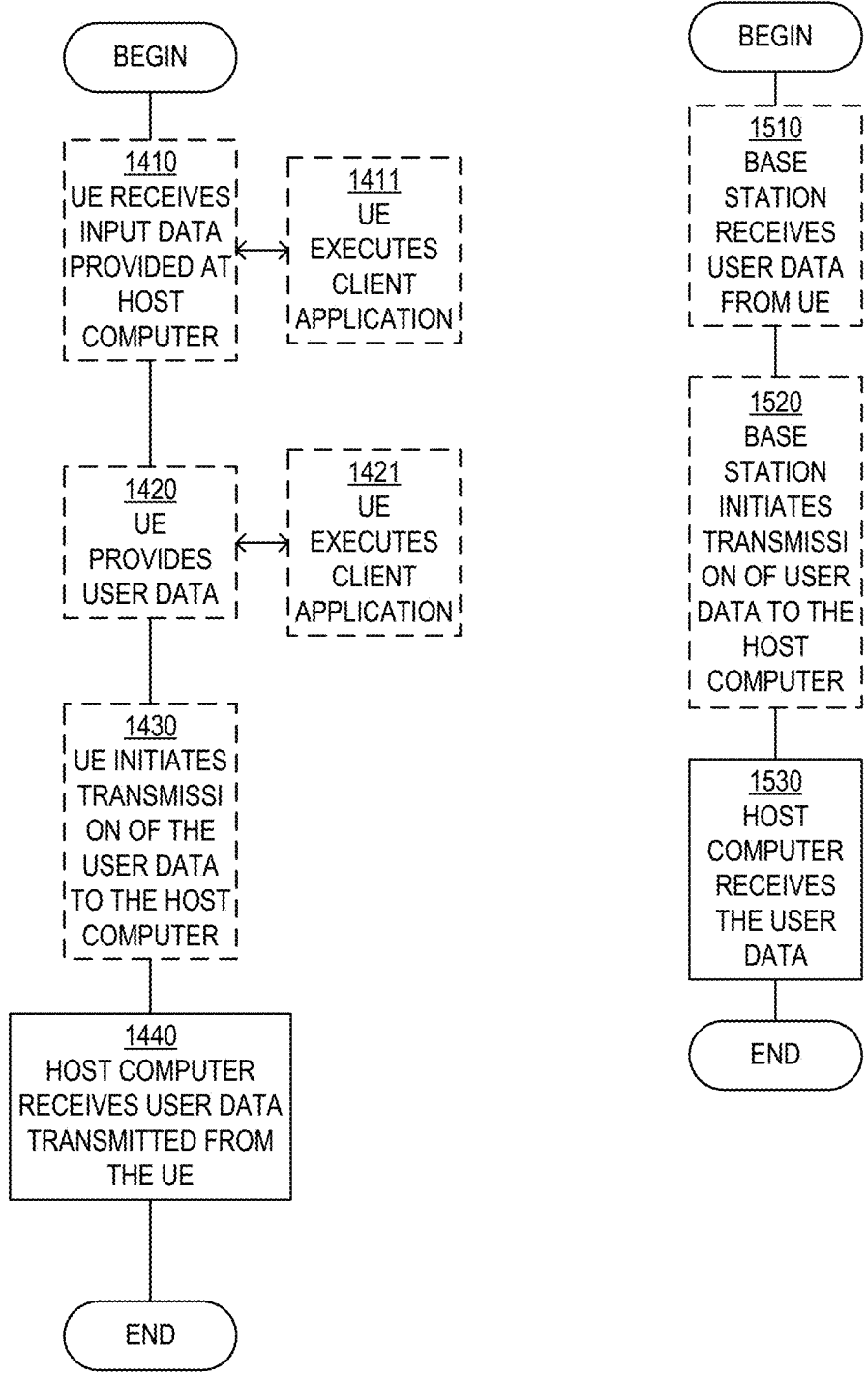
FIG. 14 is a flowchart depicting embodiments of a method in a communications system including a host computer, a base station and a user equipment.
FIG. 15 is a flowchart depicting embodiments of a method in a communications system including a host computer, a base station and a user equipment.

FIG. 14 illustrates methods implemented in a communication system including a host computer, a base station and a user equipment. FIG. 14 is a flowchart illustrating a method implemented in a communication system. The communication system includes a host computer, a first network node 103 and a UE 101 which may be those described with reference to FIG. 10 and FIG. 11. For simplicity of the present disclosure, only drawing references to FIG. 14 will be included in this section. In step 1410 (which may be optional), the UE 101 receives input data provided by the host computer. Additionally or alternatively, in step 1420, the UE 101 provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

FIG. 15 illustrates methods implemented in a communication system including a host computer, a base station and a user equipment. FIG. 15 is a flowchart illustrating a method implemented in a communication system. The communication system includes a host computer, a base station and a UE which may be those described with reference to FIG. 10 and FIG. 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Some embodiments may be summarized as follows:

A base station configured to communicate with a UE 101, the base station comprising a radio interface and processing circuitry configured to perform one or more of the actions described herein as performed by the first network node 103.

A communication system 100 including a host computer comprising:

processing circuitry configured to provide user data; and a communication interface configured to forward the user data to a cellular network for transmission to a UE 101, wherein the cellular network comprises a first network node 103 having a radio interface and processing circuitry, the base station's processing circuitry configured to perform one or more of the actions described herein as performed by the network node 103.

The communication system may further including the first network node 103.

The communication system may further include the UE 101, wherein the UE 101 is configured to communicate with the first network node 103.

The communication system, wherein:

the processing circuitry of the host computer is configured to execute a host application, thereby providing the user data; and the UE 101 comprises processing circuitry configured to execute a client application associated with the host application.

A method implemented in a first network node 103, comprising one or more of the actions described herein as performed by the first network node 103.

A method implemented in a communication system 100 including a host computer, a base station and a UE 101, the method comprising:

at the host computer, providing user data; and at the host computer, initiating a transmission carrying the user data to the UE 101 via a cellular network comprising the first network node 103, wherein the first network node 103 performs one or more of the actions described herein as performed by the first network node 103.

The method may further comprise:

at the first network node 103, transmitting the user data.

The user data may be provided at the host computer by executing a host application, and the method may further comprise:

at the UE 101, executing a client application associated with the host application.

A UE 101 configured to communicate with a first network node 103, the UE 101 comprising a radio interface and processing circuitry configured to perform one or more of the actions described herein as performed by the UE 101.

A communication system 100 including a host computer comprising:

processing circuitry configured to provide user data; and a communication interface configured to forward user data to a cellular network for transmission to a UE 101, wherein the UE comprises a radio interface and processing circuitry, the UE's processing circuitry configured to perform one or more of the actions described herein as performed by the UE 101.

The communication system may further including the UE 101.

The communication system 100, wherein the cellular network further includes a first network node 103 configured to communicate with the UE 101.

The communication system 100, wherein:

the processing circuitry of the host computer is configured to execute a host application, thereby providing the user data; and the UE's processing circuitry is configured to execute a client application associated with the host application.

A method implemented in a UE 101, comprising one or more of the actions described herein as performed by the UE 101.

A method implemented in a communication system 100 including a host computer, a first network node 103 and a UE 101, the method comprising:

at the host computer, providing user data; and at the host computer, initiating a transmission carrying the user data to the UE 101 via a cellular network comprising the base station, wherein the UE 101 performs one or more of the actions described herein as performed by the UE 101.

The method may further comprise:

at the UE 101, receiving the user data from the first network node 103.

A UE 101 configured to communicate with a first network node 103, the UE 101 comprising a radio interface and processing circuitry configured to perform one or more of the actions described herein as performed by the UE 101.

A communication system 100 including a host computer comprising:

a communication interface configured to receive user data originating from a transmission from a UE 101 to a first network node 103, wherein the UE 101 comprises a radio interface and processing circuitry, the UE's processing circuitry configured to: perform one or more of the actions described herein as performed by the UE 101.

The communication system 100 may further include the UE 101.

The communication system 100 may further include the first network node 103, wherein the first network node 103 comprises a radio interface configured to communicate with the UE 101 and a communication interface configured to forward to the host computer the user data carried by a transmission from the UE 101 to the base station.

The communication system 100, wherein:

the processing circuitry of the host computer is configured to execute a host application; and the UE's processing circuitry is configured to execute a client application associated with the host application, thereby providing the user data.

The communication system 100, wherein:

the processing circuitry of the host computer is configured to execute a host application, thereby providing request data; and the UE's processing circuitry is configured to execute a client application associated with the host application, thereby providing the user data in response to the request data.

A method implemented in a UE 101, comprising one or more of the actions described herein as performed by the UE 101.

The method may further comprise:

providing user data; and forwarding the user data to a host computer via the transmission to the first network node 103.

A method implemented in a communication system 100 including a host computer, a first network node 103 and a UE 101, the method comprising:

at the host computer, receiving user data transmitted to the first network node 103 from the UE 101, wherein the UE 101 performs one or more of the actions described herein as performed by the UE 101.

The method may further comprise:

at the UE 101, providing the user data to the first network node 103.

The method may further comprise:

at the UE 101, executing a client application, thereby providing the user data to be transmitted; and at the host computer, executing a host application associated with the client application.

The method may further comprise:

at the UE 101, executing a client application; and at the UE 101, receiving input data to the client application, the input data being provided at the host computer by executing a host application associated with the client application, wherein the user data to be transmitted is provided by the client application in response to the input data.

A first network node 103 configured to communicate with a UE 101, the first network node 103 comprising a radio interface and processing circuitry configured to perform one or more of the actions described herein as performed by the network node 103.

A communication system 100 including a host computer comprising a communication interface configured to receive user data originating from a transmission from a UE 101 to a base station, wherein the first network node 103 comprises a radio interface and processing circuitry, the base station's processing circuitry configured to perform one or more of the actions described herein as performed by the first network node 103.

The communication system 100 may further include the first network node 103.

The communication system 100 may further include the UE 101, wherein the UE 101 is configured to communicate with the first network node 103.

The communication system 100 wherein:

the processing circuitry of the host computer is configured to execute a host application;

the UE 101 is configured to execute a client application associated with the host application, thereby providing the user data to be received by the host computer.

A method implemented in a first network node 103, comprising one or more of the actions described herein as performed by any of the first network node 103.

A method implemented in a communication system including a host computer, a first network node 103 and a UE 101, the method comprising:

at the host computer, receiving, from the first network node 103, user data originating from a transmission which the base station has received from the UE 101, wherein the UE 101 performs one or more of the actions described herein as performed by the UE 101.

The method may further comprise:

at the first network node 103, receiving the user data from the UE 101.

The method may further comprise:

at the first network node 103, initiating a transmission of the received user data to the host computer.

The embodiments herein relate to NR, URLLC, PUSCH, Power Control and Inter-UE Preemption.

The embodiments herein relate to a group Common Power Backoff Indicator.

The embodiments herein relates to a method for the gNB to schedule URLLC traffic that does not need full preemption of interfering eMBB traffic. This is done by preconfiguring time/frequency regions where eMBB UEs need to use a reduced transmit power spectral density in order to use.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step.

Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second", "third", "fourth", and/or "fifth" herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments The embodiments herein are not limited to the above described embodiments. Various alternatives, modifications and equivalents may be used. Therefore, the above embodiments should not be taken as limiting the scope of the embodiments. A feature from one embodiment may be combined with one or more features of any other embodiment.

The term "at least one of A and B" should be understood to mean "only A, only B, or both A and B.", where A and B are any parameter, number, indication used herein etc.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasized that the steps of the methods may, without departing from the embodiments herein, be performed in another order than the order in which they appear herein.

EXAMPLE EMBODIMENTS

1. A method performed by a first network node (103), the method comprising:

scheduling a resource to be used by a UE (101) for transmitting data;

receiving first data for the UE (101);

scheduling the first data in at least one of a plurality of candidate regions;

determining a power backoff indicator, PBI, e.g. based on URLLC reliability and/or eMBB performance;

transmitting the PBI comprised in a PBI message to the UE (101); and receiving second data from the UE (101), wherein the second data has been adjusted based on the PBI.

2. The method according to any of the preceding embodiments, comprising:
estimating an amount of interference reduction needed for second data to be received from the UE (101) fulfilling a requirement; and
wherein the PBI is determined based on the estimated amount of interference reduction.

3. The method according to any of the preceding embodiments, comprising:
at least semi-statically configuring parameters for reference resources and power backoff regions.

4. The method according to any of the preceding embodiments, comprising:
providing information indicating the configured parameters to the UE (101).

5. The method according to any of the preceding embodiment, wherein the resource is at least one of time resources and/or frequency resources.

6. The method according to any of the preceding embodiments, wherein the data is URLLC data.

7. The method according to any of the preceding embodiments, wherein the fulfilled requirements is successful reception of the data.

8. The method according to any of the preceding embodiments, wherein the first network node (103) can signal power backoff region(s) in a reference resource on a time-frequency grid.

9. The method according to any of the preceding embodiments, wherein the power backoff region is a subset of reference resources, and wherein the reference resources spans across at least a part of the bandwidth in the frequency domain.

10. The method according to any of the preceding embodiments, wherein the reference resource has a configurable periodicity in time and/or configurable size in time.

11. The method according to any of the preceding embodiments, wherein a position of a reference resource in time is relative to power backoff message reception.

12. The method according to any of the preceding embodiments, wherein the PBI comprises a position of reference resource in time.

13. The method according to any of the preceding embodiments, wherein the reference resource is defined per carrier.

14. The method according to any of the preceding embodiments, wherein a power backoff region, PBR, is defined as a set of PBRs in the frequency domain, and
wherein the PBR is defined as a set of symbols within reference resources in the time domain.

15. The method according to any of the preceding embodiments, wherein a set of PBRs and symbols are consecutive and defined using a startPRB parameter and a startSymbol parameter.

16. The method according to any of the preceding embodiments, wherein a set of PRBs are defined as a fraction of a cell bandwidth or BWP.

17. The method according to any of the preceding embodiments, wherein a set of symbols is defined as a bitmap for a reference resource.

18. The method according to any of the preceding embodiments, comprising:
sending the PBI together with the resource to the UE.

19. The method according to any of the preceding embodiments, wherein the resource and the PBI are jointly indicated with a resourceAndPowerBackoff indicator.

20. The method according to any of the preceding embodiments, wherein a configured power backoff value comprises a value corresponding to stopping an ongoing transmission.

21. The method according to any of the preceding embodiments, wherein the PBI is transmitted as at least one of:
a group common DCI message, and/or
a UE specific DCI message, and/or
a sequence of modulation symbols, e.g. PUCCH, and/or
a sequence out of a set of possible sequences.

22. The method according to any of the preceding embodiments, wherein the PBI comprises a bit, and wherein power backoff in a region is enabled when the bit is set.

23. The method according to any of the preceding embodiments, wherein multiple PBIs are configured for a region.

24. The method according to any of the preceding embodiments, wherein a length of the PBI is equal to the number of configured sets.

25. The method according to any of the preceding embodiments, wherein the PBI indicates a power backoff value to be used for one or multiple regions.

26. The method according to any of the preceding embodiments, wherein timing of the PBI indicates which region that is addressed.

27. The method according to any of the preceding embodiments, wherein the PBI message comprises an UE identity, 28. The method according to any of the preceding embodiments, wherein the PBI indicates a power backoff region and a power backoff value.

29. The method according to any of the preceding embodiments, wherein the first network node is a gNB, enB, NB, access node, radio access node.

30. A method performed by a UE (101), the method comprising:
receiving (401) a Power Backoff Indicator, PBI, comprised in a PBI message from a first network node (103); and
responsive to determining to apply the PBI, backing (403) off the power by adjusting the power according to at least one of configuration and the PBI; and
transmitting (405) second data to the first network node (103) with the adjusted power.

31. The method according to any of the preceding embodiments, wherein the power is adjusted in affected regions.

33. The method according to any of the preceding embodiment, wherein adjusting the power comprises adjusting power spectral density of resource elements that are transmitted within a region.

34. The method according to any of the preceding embodiments, wherein power is adjusted at a start of a region and maintained for a remaining part of the slot.

35. The method according to any of the preceding embodiments, wherein power is reduced for resource elements overlapping with a power backoff region, and wherein power is increased on non-overlapping resource elements, and wherein total transmit power is unchanged.

36. The method according to any of the preceding embodiments, wherein the UE (101) determines to disregard the PBI when:
the UE has an allocation which fully overlaps with a PBR, and/or
the UE receives both a PDCCH with an uplink grant and a PDCCH with a PBI, and for which the PDCCH CORESETS have the same starting symbol.

37. The method according to any of the preceding embodiments, wherein the second data is transmitted without backoff when it has determined that the PBI should be disregarded.

38. The method according to any of the preceding embodiments, wherein the PBI comprise a bit that it set enables power backoff also for UEs that are fully overlapping with the PBR.

39. The method according to any of the preceding embodiments, comprising:
receiving a group common PBI message from the first network node, wherein the message comprises UE specific elements; and
detecting at least one of the UE specific elements.

40. The method according to any of the preceding embodiments, wherein a group common PBI message comprises a parameter, and wherein the UE enables preemption based on at least part of the parameter.

41. The method according to any of the preceding embodiments wherein the group common PBI message comprises a UE identity.

42. The method according to any of the preceding embodiments, comprising:
determining a second time-frequency region in which it will apply the PBI for the transmission, wherein the PBI is received for a transmission in a first time-frequency region.

43. The method according to any of the preceding embodiments, wherein priority information is received together with the PBI; and
wherein the decision to apply PBI or not is taken based on the priority information.

44. The method according to any of the preceding embodiments, wherein the PBI is received in a PBI message comprising multiple PBIs, and wherein the UE (101) detects the PBI addressed to itself.

45. The method according to any of the preceding embodiments, wherein the UE is an eMBB UE or a URLLC UE.

46. A first network node (103) adapted to perform the method according to any of the preceding embodiments.

47. A UE (101) adapted to perform the method according to any of the preceding embodiments.

48. A computer program comprising instructions which, when executed on at least one processor, cause the at least one processor to carry out the method according to any one of the preceding embodiments.

49. A carrier comprising the computer program of embodiment 48, wherein the carrier is one of an electronic signal, optical signal, radio signal or computer readable storage medium.

Explanations are provided below for various abbreviations/acronyms used in the present disclosure.

Abbreviation Explanation
ASIC Application-Specific Integrated Circuit
BL Bandwidth reduced Low complexity
BL-CE Bandwidth reduced Low complexity-Coverage Enhancement
BS Base Station
CE Coverage Enhancement
DCI Downlink Control Information
eBB eigenvalue based beam-forming
eMBB enhanced mobile broadband
eNB evolved Node B
FDD Frequency Division Duplex
gNB next generation Node B
HD-FDD Half-Duplex Frequency Division Duplex
IoT Internet of Things
LAA License-Assisted Access
LTE Long Term Evolution
LTE-M LTE-Machine
M2M Machine to Machine
MeNB Master Node B
MTC Machine Type Communication
NR New Radio
OFDM Orthogonal frequency-division multiplexing
OTT Over-The-Top
PDCCH Physical Downlink Control Channel
PBI Power Backoff Indicator
PBR Power Backoff Region
PDA Personal Digital Assistant
PRB Physical Resource Block
PSD Power Spectral Density
PUSCH Physical Uplink Shared Channel
SINR Signal to Interference and Noise Ratio
SoC System-on-a-Chip
TDD Time Division Duplex
UE User Equipment
URLLC Ultra-reliable and low latency communication

The invention claimed is:

1. A method performed by a first network node, the method comprising:
determining a power backoff indicator, PBI, for a first user equipment, UE, based on at least one of channel conditions of the first UE and channel conditions of a second UE, data reliability requirements of the second UE, and data performance of the first UE;
estimating an amount of interference reduction needed for second data to be received from the UE fulfilling a requirement, the PBI being determined based on the estimated amount of interference reduction;
transmitting the PBI toward the first UE; and
receiving second data from the first UE, transmission of the second data having been adjusted based on the PBI.

2. The method of claim 1, wherein the PBI indicates a power back-off for UEs in a candidate region of a plurality of candidate regions where each candidate region is configured with a power back-off value that UEs must apply when the UE is transmitting on a resource overlapping the candidate region, the method further comprising:
configuring the UE to use the resource;
receiving first data for the UE (101) on the resource; and
scheduling the first data in at least one of the plurality of candidate regions.

3. The method according to claim 1, further comprising:
semi-statically configuring parameters for reference resources and power backoff regions; and
providing information indicating the parameters configured to the UE.

4. The method according to claim 1, wherein the data is ultra-reliable and low latency communication, URLLC, data.

5. The method according to claim 1, further comprising signaling at least one power backoff region in a reference resource on a time-frequency grid.

6. The method according to claim 5, wherein the at least one power backoff region is a subset of reference resources, and wherein the reference resources spans across at least a part of the bandwidth in the frequency domain.

7. The method according to claim 1, wherein the reference resource is defined per carrier.

8. The method according to claim 1, wherein a power backoff region, PBR, is defined as a set of PBRs in the frequency domain, and
wherein the PBR is defined as a set of symbols within reference resources in the time domain.

9. The method according to claim 1, wherein the resource and the PBI are jointly indicated with a resourceAndPowerBackoff indicator.

10. A network node comprising:
processing circuitry; and
memory coupled with the processing circuitry, the memory including instructions that when executed by the processing circuitry causes the network node to perform operations comprising:
  determining a power backoff indicator, PBI, for a first user equipment, UE, based on at least one of channel conditions of the first UE and channel conditions of a second UE, data reliability requirements of the second UE, and data performance of the first UE;
  estimating an amount of interference reduction needed for second data to be received from the UE fulfilling a requirement, the PBI being determined based on the estimated amount of interference reduction;
  transmitting the PBI to the first UE; and
  receiving second data from the first UE, transmission of the second data has having been adjusted based on the PBI.

11. A method performed by a UE, the method comprising:
receiving a Power Backoff Indicator, PBI, comprised in a PBI message from a first network node;
responsive to determining to apply the PBI, backing off the power by adjusting the power according to at least one of a configuration and the PBI;
transmitting second data to the first network node with the backed off adjusted power; and
disregarding the PBI when at least one of:
  the UE has an allocation which fully overlaps with a power backoff region, PBR; and
  the UE receives both a physical downlink control channel, PDCCH, with an uplink grant and a PDCCH with a PBI, and for which PDCCH control resource sets, CORESETS, have a same starting symbol.

12. A user equipment, UE, comprising:
processing circuitry; and
memory coupled with the processing circuitry, the memory including instructions that when executed by the processing circuitry causes the UE to perform operations comprising:
  receiving a Power Backoff Indicator, PBI, comprised in a PBI message from the first network node;
  responsive to determining to apply the PBI, backing off the power by adjusting the power according to at least one of configuration and the PBI; and
  transmitting second data to the first network node with the backed off adjusted power; and
  disregarding the PBI when at least one of:
    the UE has an allocation which fully overlaps with a PBR; and
    the UE receives both a physical downlink control channel, PDCCH, with an uplink grant and a PDCCH with a PBI, and for which PDCCH control resource sets, CORESETS, have a same starting symbol.

13. The UE according to claim 12, wherein adjusting the power according to at least one of configuration and the PBI comprises adjusting the power in affected regions.

14. The UE according to claim 12, wherein adjusting the power comprises adjusting power spectral density of the resource elements that are transmitted within a region.

15. The UE according to claim 12, wherein adjusting the power comprises reducing the power for resource elements overlapping with a power backoff region, and increasing the power on non-overlapping resource elements, wherein total transmit power is unchanged.

16. The UE according to claim 12, wherein the memory includes further instructions that when executed by the processing circuitry causes the UE to perform further operations comprising transmitting the second data without adjusting the power responsive to not applying the PBI.

17. The UE according to claim 12, wherein the memory includes further instructions that when executed by the processing circuitry causes the UE to perform further operations comprising:
  receiving a group common PBI message from the first network node, wherein the message comprises UE specific elements; and
  detecting at least one of the UE specific elements.

18. The UE according to claim 17, wherein the group common PBI message comprises a parameter, and wherein the UE enables preemption based on at least part of the parameter.

19. The UE according to claim 12, wherein the memory includes further instructions that when executed by the processing circuitry causes the UE to perform further operations comprising:
  determining a second time-frequency region in which it will apply the PBI for the transmission, wherein the PBI is received for a transmission in a first time-frequency region.

20. The UE according to claim 12, wherein the memory includes further instructions that when executed by the processing circuitry causes the UE to perform further operations comprising:
  receiving priority information with the PBI; and
  wherein determining to apply PBI is based on the priority information.

* * * * *